US012511084B2

(12) United States Patent
Suzuki

(10) Patent No.: US 12,511,084 B2
(45) Date of Patent: *Dec. 30, 2025

(54) ABNORMAL SOUND DIAGNOSIS SYSTEM AND METHOD THAT CAN SPECIFY ABNORMAL SOUNDS IN TIME PERIODS WITHIN IMAGE FORMING APPARATUS, AND A NON-TRANSITORY COMPUTER-READABLE STORAGE MEDIUM

(71) Applicant: CANON KABUSHIKI KAISHA, Tokyo (JP)

(72) Inventor: Yohei Suzuki, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/499,775

(22) Filed: Nov. 1, 2023

(65) Prior Publication Data
US 2024/0061625 A1    Feb. 22, 2024

Related U.S. Application Data

(63) Continuation of application No. 18/305,835, filed on Apr. 24, 2023, now Pat. No. 11,842,095.

(30) Foreign Application Priority Data

May 2, 2022  (JP) ................. 2022-076221

(51) Int. Cl.
*G06F 3/12*  (2006.01)
*G03G 15/00*  (2006.01)

(52) U.S. Cl.
CPC ............ *G06F 3/121* (2013.01); *G06F 3/1229* (2013.01); *G03G 15/55* (2013.01)

(58) Field of Classification Search
None
See application file for complete search history.

(56) References Cited

U.S. PATENT DOCUMENTS 8,150,278 B2   4/2012   Satoh
11,514,283 B2  11/2022  Suzuki
(Continued)

FOREIGN PATENT DOCUMENTS

JP   H06-167385 A   6/1994
JP   2006-208074 A  8/2006
(Continued)

*Primary Examiner* — Haris Sabah
(74) *Attorney, Agent, or Firm* — VENABLE LLP

(57) ABSTRACT

An abnormal sound diagnosis system for specifying a cause of abnormal sound in an apparatus that includes a plurality of operating units that perform a predetermined operation and a plurality of driving units that drive the plurality of operating units: determines occurrence of abnormal sound in a plurality of time periods, based on sound wave levels of sound occurring in the apparatus measured in the plurality of time periods; obtains driving states of the plurality of driving units in the plurality of time periods; and specifies a driving unit corresponding to occurrence of abnormal sound based on a plurality of comparison results corresponding to different timings, that are obtained by comparing the driving states and the occurring states obtained at the different timings in the predetermined operation.

14 Claims, 15 Drawing Sheets

(56) References Cited

U.S. PATENT DOCUMENTS

| | | | |
|---|---|---|---|
| 2006/0001317 A1* | 1/2006 | Chen | B60R 25/33 |
| | | | 307/10.1 |
| 2013/0163779 A1* | 6/2013 | Yamaguchi | H04K 3/43 |
| | | | 381/73.1 |
| 2016/0112602 A1 | 4/2016 | Kawai | |
| 2019/0187601 A1 | 6/2019 | Seki | |
| 2019/0324226 A1* | 10/2019 | Mori | H04N 23/50 |
| 2019/0369956 A1* | 12/2019 | Sakai | G03G 15/5016 |
| 2023/0300258 A1 | 9/2023 | Suzuki | |

FOREIGN PATENT DOCUMENTS

| | | |
|---|---|---|
| JP | 2016-14818 A | 1/2016 |
| JP | 2019-110392 A | 7/2019 |

* cited by examiner

FIG. 6

SECOND MEASUREMENT; GROUP A (6a)

| | DATA 1 | DATA 2 | DATA 3 | DATA 4 | DATA 5 | DATA 6 | DATA 7 | DATA 8 | DATA 9 | DATA 10 | DATA 11 | DATA 12 | DATA 13 | DATA 14 | DATA 15 | DATA 16 |
|---|---|---|---|---|---|---|---|---|---|---|---|---|---|---|---|---|
| SOUND WAVE LEVEL DATA | 4364 | 3937 | 3905 | 3813 | 3781 | 3784 | 5296 | 3855 | 3916 | 3975 | 3857 | 3852 | 3856 | 3239 | 2940 | 2818 |
| FEED MOTOR | 1 | 1 | 1 | 0 | 0 | 0 | 0 | 0 | 0 | 0 | 0 | 0 | 0 | 0 | 0 | 0 |
| INTERMEDIATE TRANSFER MEMBER/K PHOTOSENSITIVE MEMBER DRUM MOTOR | 1 | 1 | 1 | 1 | 1 | 1 | 1 | 1 | 1 | 1 | 1 | 1 | 1 | 0 | 0 | 0 |
| YMC PHOTOSENSITIVE MEMBER DRUM MOTOR | 1 | 1 | 1 | 1 | 1 | 1 | 1 | 1 | 1 | 1 | 1 | 1 | 1 | 0 | 0 | 0 |
| FIXING MOTOR | 1 | 1 | 1 | 1 | 1 | 1 | 1 | 1 | 1 | 1 | 1 | 1 | 1 | 0 | 0 | 0 |

610

SECOND MEASUREMENT; GROUP B (6b)

| | DATA 1 | DATA 2 | DATA 3 | DATA 4 | DATA 5 | DATA 6 | DATA 7 | DATA 8 | DATA 9 | DATA 10 | DATA 11 | DATA 12 | DATA 13 | DATA 14 | DATA 15 | DATA 16 |
|---|---|---|---|---|---|---|---|---|---|---|---|---|---|---|---|---|
| SOUND WAVE LEVEL DATA | 3977 | 3933 | 3895 | 3951 | 3781 | 3784 | 5254 | 3830 | 3973 | 3922 | 3853 | 3889 | 3895 | 2955 | 2984 | 2911 |
| FEED MOTOR | 1 | 1 | 1 | 0 | 0 | 0 | 0 | 0 | 0 | 0 | 0 | 0 | 0 | 0 | 0 | 0 |
| INTERMEDIATE TRANSFER MEMBER/K PHOTOSENSITIVE MEMBER DRUM MOTOR | 1 | 1 | 1 | 1 | 1 | 1 | 1 | 1 | 1 | 1 | 1 | 1 | 1 | 0 | 0 | 0 |
| YMC PHOTOSENSITIVE MEMBER DRUM MOTOR | 1 | 1 | 1 | 1 | 1 | 1 | 1 | 1 | 1 | 1 | 1 | 1 | 0 | 0 | 0 | 0 |
| FIXING MOTOR | 1 | 1 | 1 | 1 | 1 | 1 | 1 | 1 | 1 | 1 | 1 | 1 | 1 | 0 | 0 | 0 |

FIRST MEASUREMENT

| | DATA 1 | DATA 2 | DATA 3 | DATA 4 | DATA 5 | DATA 6 | DATA 7 | DATA 8 | DATA 9 | DATA 10 | DATA 11 | DATA 12 | DATA 13 | DATA 14 | DATA 15 | DATA 16 | COS SIMILARITY |
|---|---|---|---|---|---|---|---|---|---|---|---|---|---|---|---|---|---|
| ABNORMAL SOUND LEVEL | 1 | 1 | 1 | 1 | 1 | 1 | 1 | 1 | 1 | 1 | 1 | 1 | 1 | 1 | 1 | 1 | |
| FEED MOTOR | 1 | 1 | 1 | 1 | 1 | 1 | 1 | 1 | 1 | 1 | 1 | 1 | 1 | 1 | 1 | 1 | 1.00 |
| INTERMEDIATE TRANSFER MEMBER/ K PHOTOSENSITIVE MEMBER DRUM MOTOR | 0 | 0 | 0 | 0 | 0 | 0 | 0 | 0 | 1 | 1 | 1 | 1 | 1 | 1 | 1 | 1 | 0.43 |
| YMC PHOTOSENSITIVE MEMBER DRUM MOTOR | 0 | 0 | 0 | 0 | 0 | 0 | 0 | 0 | 1 | 1 | 1 | 1 | 1 | 1 | 1 | 1 | 0.43 |
| FIXING MOTOR | 1 | 1 | 1 | 1 | 1 | 1 | 1 | 1 | 1 | 1 | 1 | 1 | 1 | 1 | 1 | 1 | 1.00 |

FIG. 9B

SECOND MEASUREMENT

| | DATA 1 | DATA 2 | DATA 3 | DATA 4 | DATA 5 | DATA 6 | DATA 7 | DATA 8 | DATA 9 | DATA 10 | DATA 11 | DATA 12 | DATA 13 | DATA 14 | DATA 15 | DATA 16 | COS SIMILARITY |
|---|---|---|---|---|---|---|---|---|---|---|---|---|---|---|---|---|---|
| ABNORMAL SOUND LEVEL | 1 | 1 | 1 | 1 | 1 | 1 | 1 | 1 | 1 | 1 | 1 | 1 | 1 | 0 | 0 | 0 | |
| FEED MOTOR | 1 | 1 | 1 | 0 | 1 | 0 | 1 | 0 | 1 | 0 | 0 | 0 | 1 | 0 | 0 | 0 | 0.48 |
| INTERMEDIATE TRANSFER MEMBER/ K PHOTOSENSITIVE MEMBER DRUM MOTOR | 1 | 1 | 1 | 1 | 1 | 1 | 1 | 1 | 1 | 1 | 1 | 1 | 1 | 0 | 0 | 0 | 1.00 |
| YMC PHOTOSENSITIVE MEMBER DRUM MOTOR | 1 | 1 | 1 | 1 | 1 | 1 | 1 | 1 | 1 | 1 | 1 | 1 | 1 | 0 | 0 | 0 | 1.00 |
| FIXING MOTOR | 1 | 1 | 1 | 1 | 1 | 1 | 1 | 1 | 1 | 1 | 1 | 1 | 1 | 0 | 0 | 0 | 1.00 |

FIG. 9C

AVERAGE VALUE OF FIRST AND SECOND MEASUREMENT
COS SIMILARITY

| ABNORMAL SOUND LEVEL | COS SIMILARITY |
|---|---|
| FEED MOTOR | 0.74 |
| INTERMEDIATE TRANSFER MEMBER/ K PHOTOSENSITIVE MEMBER DRUM MOTOR | 0.72 |
| YMC PHOTOSENSITIVE MEMBER DRUM MOTOR | 0.72 |
| FIXING MOTOR | 1.00 |

FIG. 10

| | COS SIMILARITY | |
|---|---|---|
| | MONOCHROMATIC OPERATION | FULL-COLOR OPERATION |
| INTERMEDIATE TRANSFER MEMBER/K PHOTOSENSITIVE MEMBER DRUM MOTOR | 0.00 | 1.00 |
| YMC PHOTOSENSITIVE MEMBER DRUM MOTOR | — | 1.00 |

FIG. 12

| | COS SIMILARITY IN CALIBRATION OPERATION | | | |
|---|---|---|---|---|
| | DETECTION TEMPERATURE LOW TEMPERATURE | | DETECTION TEMPERATURE HIGH TEMPERATURE | |
| | MONOCHROMATIC OPERATION | FULL-COLOR OPERATION | MONOCHROMATIC OPERATION | FULL-COLOR OPERATION |
| INTERMEDIATE TRANSFER MEMBER/K PHOTOSENSITIVE MEMBER DRUM MOTOR | 0.00 | 1.00 | 0.00 | 0.00 |
| YMC PHOTOSENSITIVE MEMBER DRUM MOTOR | 0.00 | — | 0.00 | — |
| DEVELOPING MOTOR | 0.00 | 1.00 | 0.00 | 0.00 |

FIG. 14A

| | DATA 1 | DATA 2 | DATA 3 | DATA 4 | DATA 5 | DATA 6 | DATA 7 | DATA 8 | DATA 9 | DATA 10 | DATA 11 | DATA 12 | DATA 13 | DATA 14 | DATA 15 | DATA 16 | COS SIMILARITY |
|---|---|---|---|---|---|---|---|---|---|---|---|---|---|---|---|---|---|
| ABNORMAL SOUND LEVEL | 1 | 1 | 1 | 0 | 0 | 0 | 0 | 0 | 0 | 0 | 0 | 0 | 0 | 0 | 0 | 0 | |
| FEED MOTOR | 1 | 1 | 1 | 0 | 0 | 0 | 0 | 0 | 0 | 0 | 0 | 0 | 0 | 0 | 0 | 0 | 1.00 |
| INTERMEDIATE TRANSFER MEMBER/ K PHOTOSENSITIVE MEMBER DRUM MOTOR | 1 | 1 | 1 | 1 | 1 | 1 | 1 | 1 | 1 | 1 | 1 | 0 | 0 | 0 | 0 | 0 | 0.55 |
| YMC PHOTOSENSITIVE MEMBER DRUM MOTOR | 1 | 1 | 1 | 1 | 1 | 1 | 1 | 1 | 1 | 1 | 1 | 1 | 1 | 0 | 0 | 0 | 0.55 |
| FIXING MOTOR | 1 | 1 | 1 | 1 | 1 | 1 | 1 | 1 | 1 | 1 | 1 | 1 | 1 | 0 | 0 | 0 | 0.55 |

FIG. 14B

| | DATA 1 | DATA 2 | DATA 3 | DATA 4 | DATA 5 | DATA 6 | DATA 7 | DATA 8 | DATA 9 | DATA 10 | DATA 11 | DATA 12 | DATA 13 | DATA 14 | DATA 15 | DATA 16 | COS SIMILARITY |
|---|---|---|---|---|---|---|---|---|---|---|---|---|---|---|---|---|---|
| ABNORMAL SOUND LEVEL | 1 | 1 | 1 | 1 | 1 | 1 | 0 | 0 | 0 | 0 | 0 | 0 | 0 | 0 | 0 | 0 | |
| FEED MOTOR | 1 | 1 | 1 | 1 | 0 | 0 | 0 | 0 | 0 | 0 | 0 | 0 | 0 | 0 | 0 | 0 | 0.87 |
| INTERMEDIATE TRANSFER MEMBER/ K PHOTOSENSITIVE MEMBER DRUM MOTOR | 1 | 1 | 1 | 1 | 1 | 1 | 1 | 1 | 1 | 1 | 1 | 0 | 0 | 0 | 0 | 0 | 0.55 |
| YMC PHOTOSENSITIVE MEMBER DRUM MOTOR | 1 | 1 | 1 | 1 | 1 | 1 | 1 | 1 | 1 | 1 | 1 | 1 | 1 | 0 | 0 | 0 | 0.55 |
| FIXING MOTOR | 1 | 1 | 1 | 1 | 1 | 1 | 1 | 1 | 1 | 1 | 1 | 1 | 1 | 0 | 0 | 0 | 0.55 |

FIG. 14C

| | DATA 1 | DATA 2 | DATA 3 | DATA 4 | DATA 5 | DATA 6 | DATA 7 | DATA 8 | DATA 9 | DATA 10 | DATA 11 | DATA 12 | DATA 13 | DATA 14 | DATA 15 | DATA 16 | COS SIMILARITY |
|---|---|---|---|---|---|---|---|---|---|---|---|---|---|---|---|---|---|
| ABNORMAL SOUND LEVEL | 1 | 1 | 1 | 1 | 1 | 1 | 1 | 1 | 1 | 1 | 0 | 0 | 0 | 0 | 0 | 0 | |
| FEED MOTOR | 1 | 1 | 1 | 1 | 1 | 1 | 0 | 0 | 0 | 0 | 0 | 0 | 0 | 0 | 0 | 0 | 0.92 |
| INTERMEDIATE TRANSFER MEMBER/ K PHOTOSENSITIVE MEMBER DRUM MOTOR | 1 | 1 | 1 | 1 | 1 | 1 | 1 | 1 | 1 | 1 | 1 | 0 | 0 | 0 | 0 | 0 | 0.73 |
| YMC PHOTOSENSITIVE MEMBER DRUM MOTOR | 1 | 1 | 1 | 1 | 1 | 1 | 1 | 1 | 1 | 1 | 1 | 1 | 1 | 0 | 0 | 0 | 0.73 |
| FIXING MOTOR | 1 | 1 | 1 | 1 | 1 | 1 | 1 | 1 | 1 | 1 | 1 | 1 | 1 | 0 | 0 | 0 | 0.73 |

# ABNORMAL SOUND DIAGNOSIS SYSTEM AND METHOD THAT CAN SPECIFY ABNORMAL SOUNDS IN TIME PERIODS WITHIN IMAGE FORMING APPARATUS, AND A NON-TRANSITORY COMPUTER-READABLE STORAGE MEDIUM

This application is a continuation of U.S. patent application Ser. No. 18/305,835 filed Apr. 24, 2023, the contents of which are incorporated by reference herein.

BACKGROUND OF THE INVENTION

Field of the Invention

The present invention relates to an abnormal sound diagnosis system, an image forming apparatus, an abnormal sound diagnosis method, and a storage medium.

Description of the Related Art

Image forming apparatuses such as copiers and laser printers include a replacement unit that is replaced due to the lifespan thereof. If the replacement unit is used beyond its lifespan, abnormal sound may be emitted in accordance with the state of the unit. A conveyance roller disposed in a conveyance unit for conveying sheets may emit abnormal sound due to abrasion between a roller shaft and a shaft bearing, for example. Occurrence of abnormal sound may indicate that a replacement unit has been used beyond the lifespan thereof, or may be an indicator of a prior warning that a failure will occur, and provides a feeling of discomfort to the user. Therefore, there is desire to perform determination on occurrence of abnormal sound, and specify a replacement unit that is emitting the abnormal sound.

Japanese Patent Laid-Open No. 2016-014818 discloses a technique for detecting occurrence of abnormal sound by obtaining operation sound at a predetermined timing using a sound collector disposed in an image forming apparatus, and specifying a component that is emitting the abnormal sound. The predetermined timing is a timing when known abnormal sound that is grasped by a developer in order to determine the state of a component is emitted.

However, in the technique disclosed in Japanese Patent Laid-Open No. 2016-014818, it is possible to perform determination only on known abnormal sound, and it is not possible to perform determination on unknown abnormal sound, specifically, abnormal sound that is not grasped by the developer during apparatus development.

SUMMARY OF THE INVENTION

The present invention provides a technique that can specify occurrence of abnormal sound and a cause thereof regardless of whether the abnormal sound is known or unknown.

According to one aspect of the present invention, there is provided an abnormal sound diagnosis system for specifying a cause of abnormal sound in an apparatus that includes a plurality of operating units that perform a predetermined operation and a plurality of driving units that drive the plurality of operating units, the system comprising: a determination unit configured to perform determination on occurrence of abnormal sound in a plurality of time periods, based on sound wave levels of sound occurring in the apparatus measured in the plurality of time periods; an obtaining unit configured to obtain driving states of the plurality of driving units in the plurality of time periods; and a specifying unit configured to specify a driving unit corresponding to abnormal sound that has occurred, from among the plurality of driving units, based on occurring states of abnormal sound determined by the determination unit, and the driving states obtained by the obtaining unit, wherein the specifying unit compares the driving states and the occurring states obtained at different timings in the predetermined operation, thereby obtains a plurality of comparison results corresponding to the different timings, and specifies a driving unit corresponding to occurrence of abnormal sound based on the plurality of comparison results.

Further features of the present invention will become apparent from the following description of exemplary embodiments with reference to the attached drawings.

BRIEF DESCRIPTION OF THE DRAWINGS

FIG. 6 is an explanatory diagram showing results of classification performed by a classifying unit according to the first embodiment.

FIGS. 9A to 9C are explanatory diagrams showing results of determination performed by the cause specifying unit according to the first embodiment.

FIG. 10 is an explanatory diagram showing results of determination performed by a cause specifying unit according to a second embodiment.

FIG. 12 is an explanatory diagram showing results of determination performed by a cause specifying unit according to a third embodiment.

FIGS. 14A to 14C are explanatory diagrams showing results of determination performed by a cause specifying unit according to a fourth embodiment.

DESCRIPTION OF THE EMBODIMENTS

Figure 1:
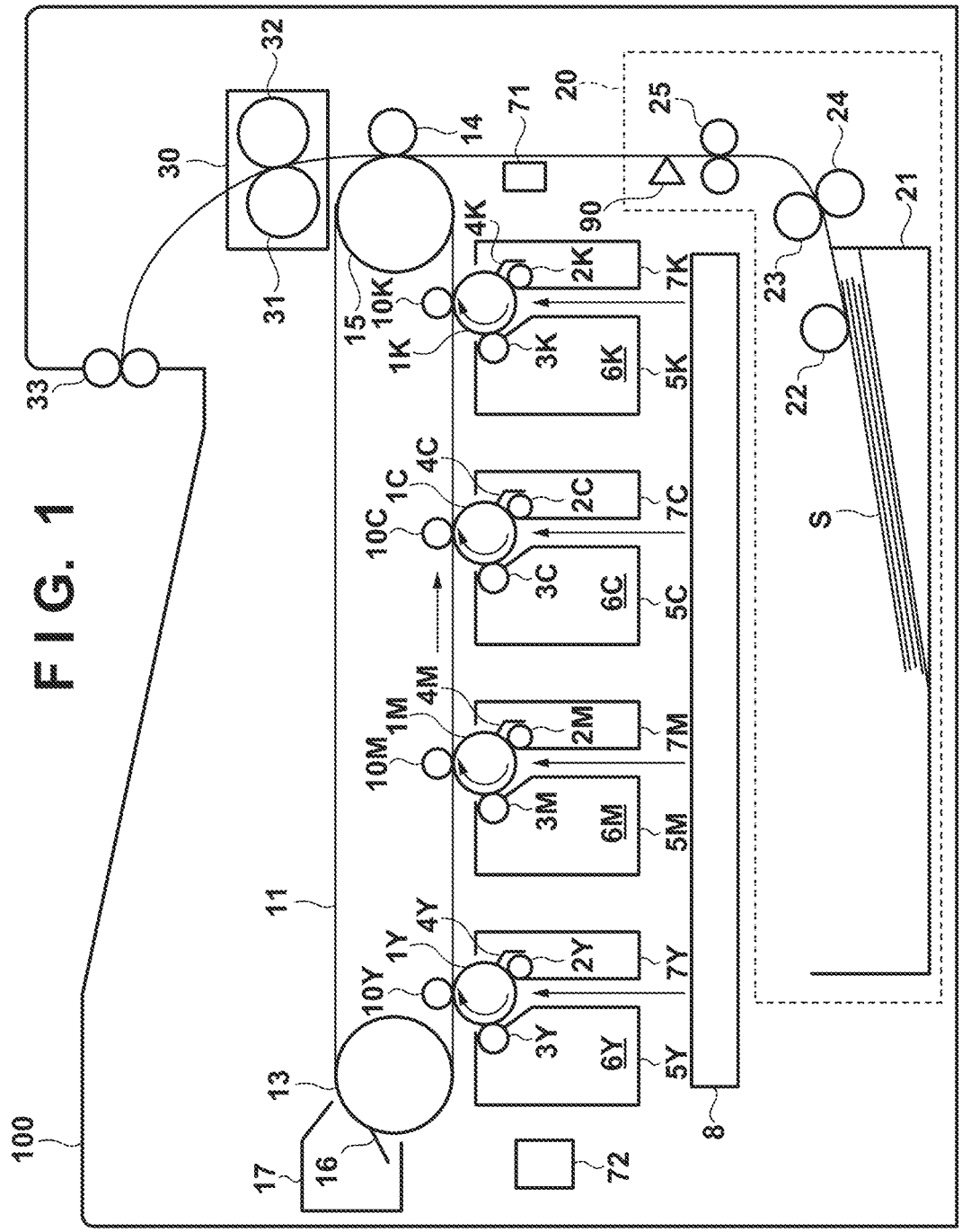
FIG. 1 is a schematic diagram schematically showing an exemplary configuration of an image forming apparatus according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

First Embodiment

Description of Image Forming Apparatus

An overview of an electrophotographic image forming apparatus to which embodiments of the present invention can be applied will be given. FIG. 1 is a diagram schematically showing an exemplary configuration of a printer 100 in which an intermediate transfer belt is used and a plurality of image forming units are configured in parallel.

The printer 100 is a tandem color laser beam printer, and is configured to be able to output a color image by overlaying four colors of toner, namely yellow (Y) toner, magenta (M) toner, cyan (C) toner, and black (K) toner on one another. In the following description, regarding members for which there is no particular need to distinguish yellow, magenta, cyan, and black from one another, suffixes "Y", "M", "C", and "K" attached to reference numerals are omitted for convenience of description.

Process cartridges 5 each include a toner container 6, a photosensitive member drum 1 that is an image carrier, a charging roller 2, a developing roller 3, a drum cleaning blade 4, and a drum waste toner container 7. A laser unit 8 is disposed below the process cartridges 5, and exposes the photosensitive member drums 1 to laser light based on image signals. A predetermined negative voltage is applied to each charging roller 2, thereby the photosensitive member drum 1 is charged to a predetermined negative potential, and an electrostatic latent image is formed by the laser unit 8. This electrostatic latent image is subjected to reversal development by a predetermined negative voltage being applied to the developing roller 3, and Y, M, C, and K toner images are formed on the respective photosensitive member drums 1. Note that toner used in the present embodiment is charged to a negative polarity.

An intermediate transfer member unit is constituted by an intermediate transfer member 11, a tension roller 13, a driving roller 15, an intermediate transfer member cleaning blade 16, and a waste toner collecting container 17. In addition, a configuration is adopted in which primary transfer rollers 10 are disposed in the intermediate transfer member 11, respectively opposing the photosensitive member drums 1, where a transfer voltage is applied by a voltage applying means (not shown). Toner images formed on the photosensitive member drums 1 are primarily transferred onto the intermediate transfer member 11, as a result of the photosensitive member drums 1 and the intermediate transfer members 11 rotating in the arrow directions, and additionally a positive voltage being applied to the primary transfer rollers 10. The toner images on the photosensitive member drums 1 are primarily transferred onto the intermediate transfer member 11 in order of Y, M, C, and K, and are conveyed to a primary transfer roller 14 in a state where the four color toner images are overlaid on one another. Toner that could not be transferred remains on the photosensitive member drums 1 and the intermediate transfer member 11. The photosensitive member drums 1 and the intermediate transfer member 11 are respectively cleaned by the drum cleaning blades 4 and the intermediate transfer member cleaning blade 16, and the remaining toner is collected in the drum waste toner containers 7 and the waste toner collecting container 17.

A feeding mechanism 20 includes a sheet feeding roller 22 for feeding a printing material S accommodated on a feeding cassette 21, a conveyance roller 23 for conveying the fed printing material S, a separating roller 24 for separately conveying each printing material S at a time, and a pair of resist rollers 25. The printing material S conveyed from the feeding mechanism 20 is conveyed to the primary transfer roller 14 by the pair of resist rollers 25. At this time, a conveyance sensor 90 detects the printing material S being conveyed downstream of the pair of resist rollers 25. In order to transfer the toner images from the intermediate transfer member 11 to the printing material S, a positive voltage is applied to the primary transfer roller 14. Accordingly, the toner images on the intermediate transfer member 11 are primarily transferred onto the printing material S that is being conveyed. The printing material S onto which the toner images were transferred is conveyed to a fixing unit 30, and is heated and pressurized by a fixing film 31 and a pressing roller 32, and the toner images are fixed onto the surface of the printing material S. The printing material S to which the toner images were fixed is discharged by a pair of paper discharge rollers 33.

In the printer 100, a receiving unit 71 that receives sound waves is disposed between the conveyance sensor 90 and the primary transfer roller 14. The receiving unit 71 includes a Micro Electro Mechanical System (MEMS) microphone that converts vibration displacement of a vibration plate caused by pressure into a voltage change, and outputs the voltage change. Note that, as long as sound waves can be received, it is also possible to use a microphone other than a MEMS microphone, such as a capacitor microphone. A temperature detection unit 72 detects the temperature in the printer 100. The temperature detection unit 72 is a constituent element that is used in the third embodiment, and may be omitted in embodiments other than the third embodiment.

Description of Hardware Configuration

Figure 2:
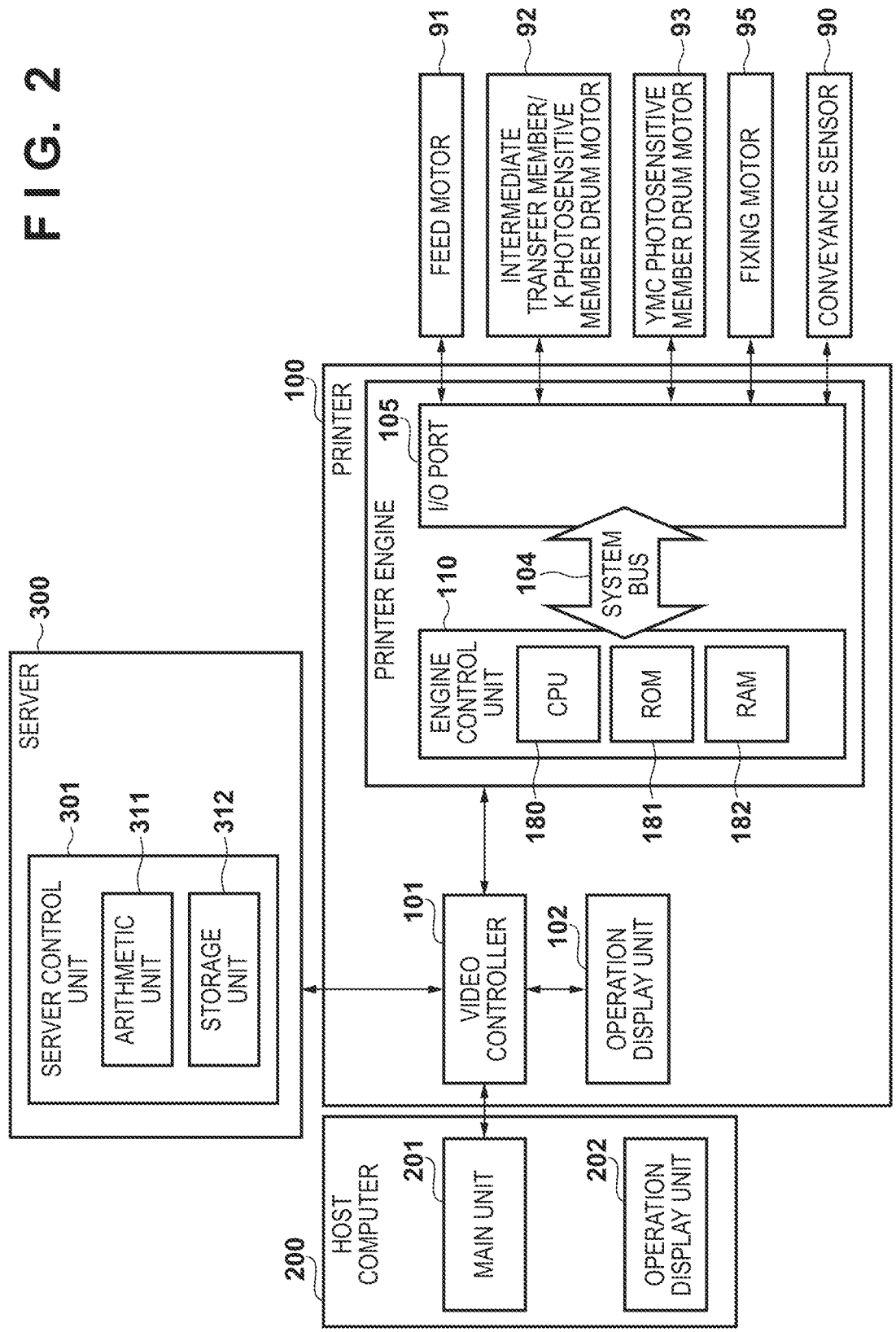
FIG. 2 is a block diagram showing an exemplary hardware configuration of an image forming system according to the first embodiment.

FIG. 2 is a block diagram showing an exemplary hardware configuration of an image forming system according to the present embodiment. The hardware configuration according to the present embodiment includes the printer 100, a host computer 200, and a server 300 as shown in FIG. 2. The host computer 200 includes a main unit 201 that instructs, via a network, the printer 100 to perform printing, and an operation display unit 202. Here, the operation display unit 202 of the host computer 200 includes a display, a keyboard, a mouse, and the like (not shown). The printer 100 that is an image forming apparatus and the server 300 that is an information processing apparatus constitute an abnormal sound diagnosis system for specifying occurrence of abnormal sound in the image forming apparatus and a cause thereof.

The printer 100 includes a video controller 101, an operation display unit 102, and a printer engine 103. Here, the operation display unit 102 of the printer 100 includes an operation panel, operation buttons, and the like (not shown). The video controller 101 transmits, to the printer engine 103, print data and a print instruction transmitted from the host computer 200, and print setting information such as a type of printing material.

The printer engine 103 is constituted by an engine control unit 110 that includes a CPU 180, a ROM 181, and a RAM 182, a system bus 104, and an IO port 105. The CPU 180 executes a program stored in the ROM 181, using the RAM 182 as a work area. The above-mentioned constituent elements can access the IO port 105 via the interactively accessible system bus 104. The conveyance sensor 90 and various motors are connected to the IO port 105.

In the example of the printer 100 according to the present embodiment, the motors include the following four types of motors. A feed motor 91 drives the sheet feeding roller 22, the conveyance roller 23, and the pair of resist rollers 25 for conveying a sheet S. An intermediate transfer member/K photosensitive member drum motor 92 rotates the intermediate transfer member 11 in the arrow direction in FIG. 1 by driving the driving roller 15. At the same time, a K photosensitive member drum 1K is rotated in the arrow direction in FIG. 1. A YMC photosensitive member drum motor 93 drives a Y photosensitive member drum 1Y, an M photosensitive member drum 1M, and a C photosensitive member drum 1C in the arrow direction in FIG. 1. The intermediate transfer member/K photosensitive member drum motor 92 and the YMC photosensitive member drum motor 93 are disposed in drive units (not shown). A fixing motor 95 drives the pressing roller 32 of the fixing unit 30.

The engine control unit 110 (the CPU 180) controls these actuators via the IO port 105 based on print setting information and the like transmitted from the host computer 200. If, for example, information regarding a type of printing material in the print setting information indicates "plain paper" (a printing material whose grammage is about 80 g/m$^2$), the speed of the actuators is controlled for plain paper set in the printer, and printing is performed. If the information regarding the type of printing material indicates "thick paper" (whose grammage is about 120 g/m$^2$), the speed setting of the actuators is set to half the speed for plain paper, to improve the fixing performance of the fixing unit.

The server 300 includes a sever control unit 301 that includes an arithmetic unit 311 and a storage unit 312, and is connected to the printer 100 using an interactively accessible network. The arithmetic unit 311 executes a program stored in the storage unit 312, and reads/writes various types of data. A CPU or a GPU may be directly allocated for the arithmetic unit 311, and a RAM, an HDD, an SSD, or the like may be directly allocated to the storage unit 312, or a virtual environment such as a virtual machine may also be allocated. The sever control unit 301 can transmit/receive information to/from the engine control unit 110 via the video controller 101.

Description of Functional Block Diagram

Figure 3:
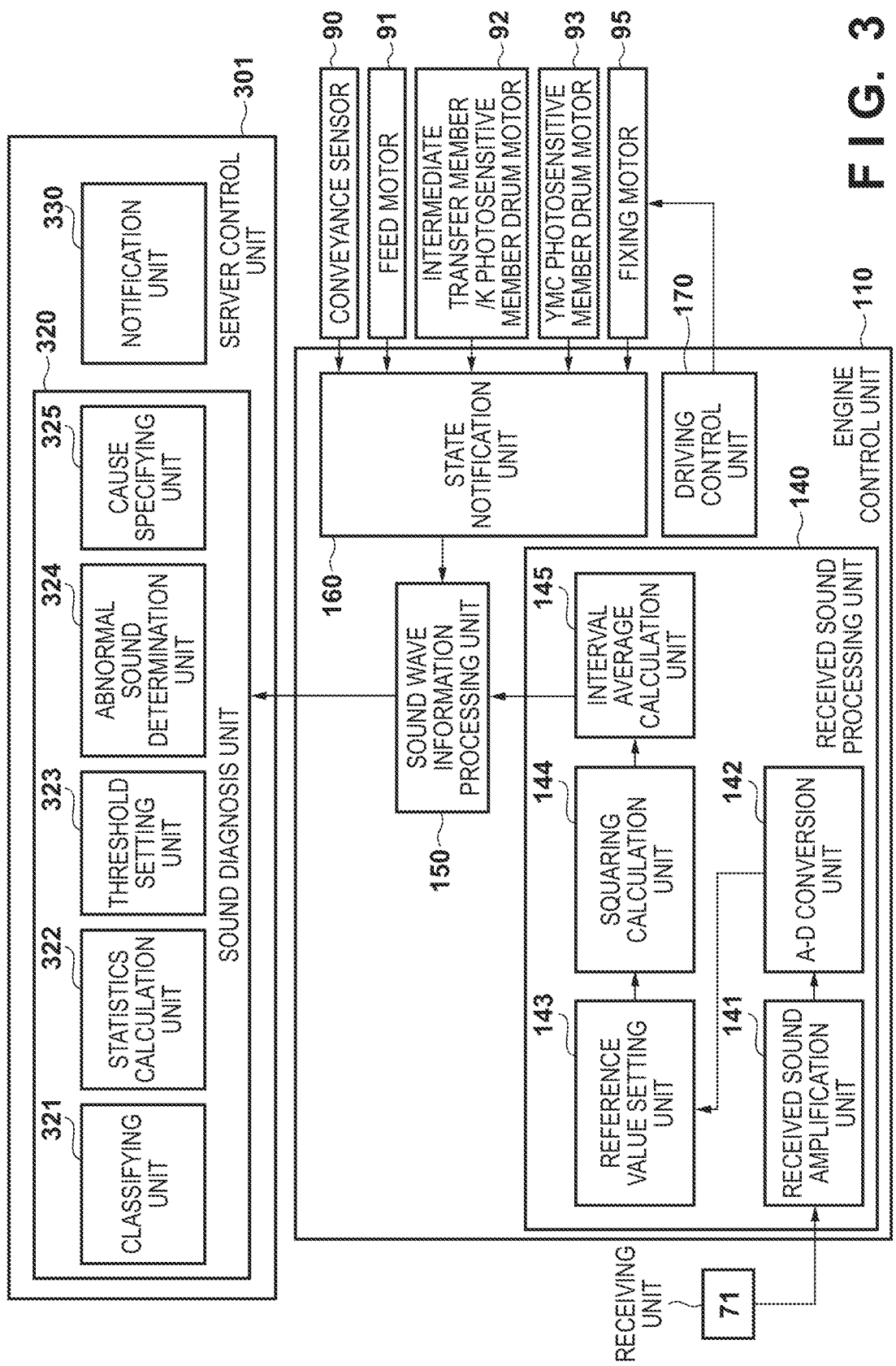
FIG. 3 is a block diagram showing an exemplary functional configuration of a control unit according to the first embodiment.

Functions of the engine control unit 110 and the sever control unit 301 will be described. FIG. 3 is a block diagram showing an exemplary functional configuration of the engine control unit 110 and the sever control unit 301. The functions of the engine control unit 110 can be realized, for example, by the CPU 180 executing a predetermined program stored in the ROM 181. In addition, the functions of the sever control unit 301 can be realized by the arithmetic unit 311 executing a predetermined program stored in the storage unit 312. Note that the functions of each of the engine control unit 110 and the sever control unit 301 may be realized by dedicated hardware, or may be realized by software and hardware in cooperation with each other. The engine control unit 110 has a function of processing received sound, and a function of adding information regarding a sensor and a motor to information regarding sound obtained by processing the received sound, and obtaining sound data. In addition, the sever control unit 301 has a function of specifying, based on sound data, whether or not abnormal sound has occurred, and a function of specifying a member that is emitting abnormal sound. Description thereof will be given in order.

The engine control unit 110 includes a received sound processing unit 140, a sound wave information processing unit 150, and a state notification unit 160. When the printer engine 103 receives a print instruction, the engine control unit 110 measures received sound using the receiving unit 71 at a predetermined timing, which will be described later. Functional units of the received sound processing unit 140 then process sound received by the receiving unit 71, as follows. A received sound amplification unit 141 amplifies a voltage indicating the level of the sound received by the receiving unit 71 (operation sound inside the printer 100). An A-D conversion unit 142 converts the voltage output by the received sound amplification unit 141 into a digital signal. The voltage output by the receiving unit 71 takes a positive value, and thus there is a need to remove a DC component, and extract a pressure change in the sound. A reference value setting unit 143 subtracts a reference value from a value indicated by the digital signal input by the A-D conversion unit 142, and extracts a pressure change in the sound.

A squaring calculation unit 144 performs squaring calculation of the digital signals for which the reference value setting unit 143 has set the reference value. An interval average calculation unit 145 performs interval average calculation of digital signals subjected to squaring calculation performed by the squaring calculation unit 144. The time interval at which interval average calculation is performed is 100 ms, for example. A time length at which interval average calculation is performed is not limited thereto, and can be changed for each measurement. Through squaring calculation and interval average calculation, digital signals for which the reference value has been set become time-series sound wave level data indicating the magnitude of sound pressure change for each time interval. The sound wave level data is stored in the sound wave information processing unit 150. The state notification unit 160 notifies the sound wave information processing unit 150 of information from a sensor, information indicating the driving states of the motors or the like (hereinafter, actuator information). The sound wave information processing unit 150 synchronizes, with the sound wave level data from the received sound processing unit 140, the driving states of the actuators indicated by the actuator information notified by the state notification unit 160. A detailed description thereof will be given later. Sound data obtained through processing performed by the sound wave information processing unit 150 (data obtained by associating the states of the actuators with the sound wave level data) is also stored in the storage unit 312 of the sever control unit 301 via the video controller 101. A driving control unit 170 controls driving of a plurality of actuators (for example, the above four types of motors). Note that the state notification unit 160 may obtain actuator information from the actuators, or may obtain actuator information from a driving instruction signal output to the actuators by the driving control unit 170.

A sound diagnosis unit 320 analyzes the sound data, determines whether or not abnormal sound has occurred, and specifies a cause of occurrence of abnormal sound. The sound diagnosis unit 320 includes a classifying unit 321, a statistics calculation unit 322, a threshold setting unit 323, an abnormal sound determination unit 324, and a cause specifying unit 325. The classifying unit 321 classifies a set of sound data stored in the storage unit 312 into a plurality of subsets based on a predetermined criterion. The statistics calculation unit 322 calculates statistical values from the respective subsets obtained as a result of classification. The threshold setting unit 323 further performs statistics processing of the statistical values calculated by the statistics calculation unit 322, and sets a threshold value. The abnormal sound determination unit 324 determines whether or not abnormal sound has occurred in the subsets. The cause specifying unit 325 specifies a unit or a member that emitted abnormal sound (specifies a cause), based on a plurality of results of abnormal sound determination performed by the abnormal sound determination unit 324. A result of specifying a cause is notified to the host computer 200 of the user, the dealer, or the like, a printer management tool (not shown), and the like by a notification unit 330.

Next, information regarding sound that is synchronized by the sound wave information processing unit 150 with a timing when received sound is measured by the receiving unit 71 will be described.

The received sound processing unit 140 measures sound in the printer 100 at different timings in an image forming operation performed on a printing material. The received sound processing unit 140 according to the present embodiment causes the receiving unit 71 to measure sound in the printer 100 at the following two timings (first measurement and second measurement), for example. In the first measurement, received sound is measured from a time point when a print instruction is given and the printing material S is fed by the sheet feeding roller 22 until after 1600 ms elapsed during which the printing material S reaches the primary transfer roller 14. In the second measurement, received sound is measured from a timing when the trailing edge of the last printing material left the conveyance sensor 90 until after 1600 ms elapsed during which the printer stopped operating. The measurement time and timings are not limited to this example. Note that a measurement time can be suitably set, but it is possible to reduce loads imposed on the printer 100 and the sever control unit 301 and constraints on a memory capacity due to an increase in measurement data, by limiting the measurement time. As described above, in the present embodiment, the interval average calculation unit 145 performs interval average calculation in every 100 ms, and thus, both in the first measurement and the second measurement, data for 16 intervals is collected in the measurement time of 1600 ms.

In the first and second measurements, when measurement is started, the received sound processing unit 140 obtains sound wave level data for each interval by performing the above interval average calculation, and stores the obtained sound wave level data. Accordingly, sound wave level data for 16 time intervals, namely, data 1 to 16 is obtained and stored. In addition, the sound wave information processing unit 150 obtains actuator information notified from the state notification unit 160, for the same time intervals (100 ms) as the time intervals of interval average calculation in which sound wave level data is calculated, and associates the sound wave level data and the actuator information with each other. In this manner, the sound wave information processing unit 150 obtains data by synchronizing the sound wave level data and the actuator information with each other (hereinafter, referred to as "sound data"), and provides the sound data to the sever control unit 301 (the sound diagnosis unit 320). Note that, when there is no need to reduce the load on the printer 100 and the sever control unit 301, measurement may be constantly continued, and an analysis interval may be specified in later-described processing performed by the sound diagnosis unit 320. Note that the sound wave level data and the actuator information are obtained in every 100 ms, but there is no limitation thereto. Sound wave level data and actuator information may be synchronized with each other with a shorter time interval, for example.

Description of Operation of Sound Diagnosis Unit 320

Figure 4:
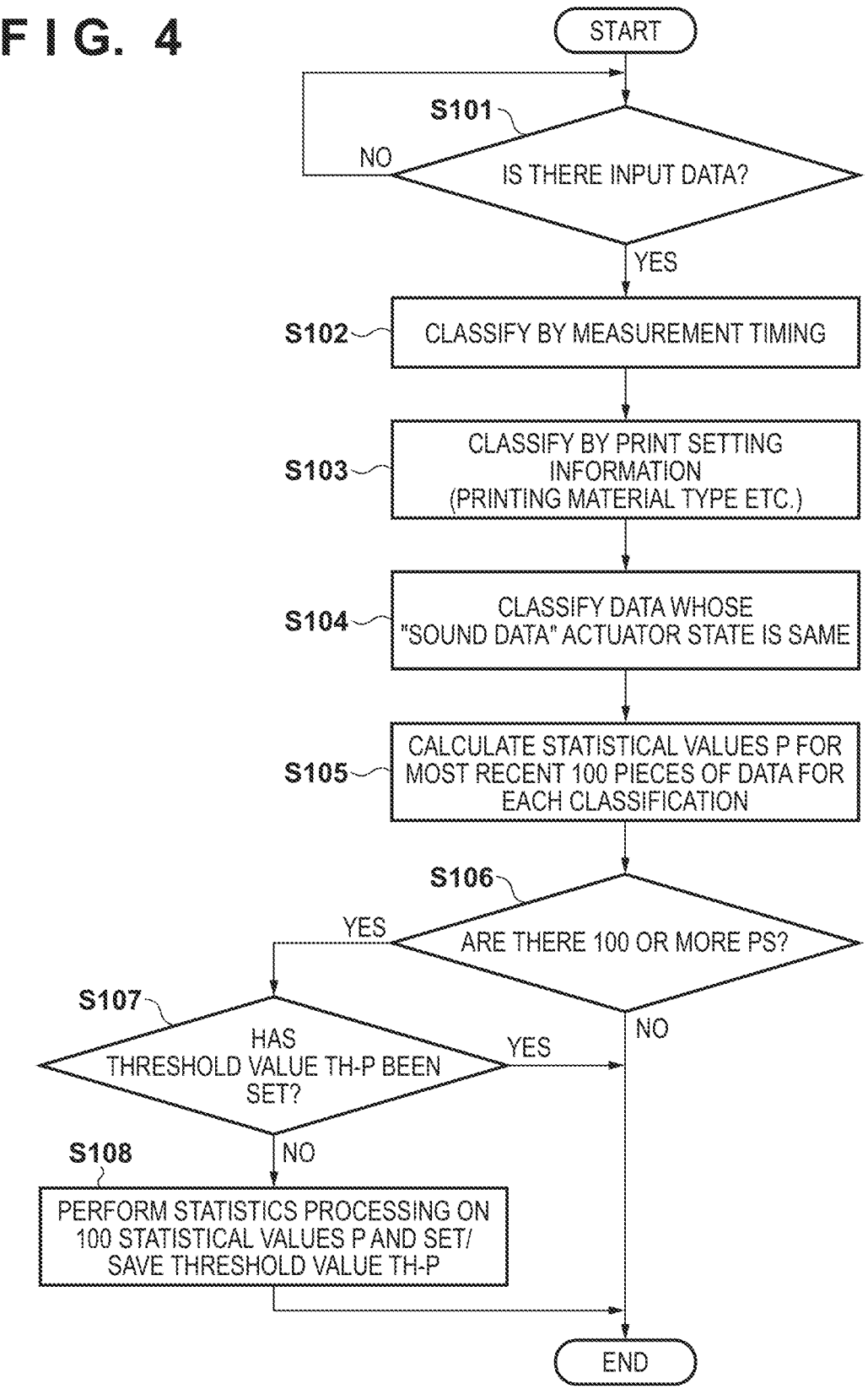
FIG. 4 is a flowchart showing an example of processing that is performed by a sound diagnosis unit according to the first embodiment.

FIG. 4 is a flowchart showing an example of processing related to classification of sound data, the processing being included in statistics generation processing that is executed by the server 300 in the present embodiment. In the following description, processing steps are abbreviated as S (steps).

In step S101, the classifying unit 321 checks whether or not there is sound data newly input to the storage unit 312 of the sever control unit 301. If there is new input data, the classifying unit 321 starts to classify the new sound data. In step S102, the classifying unit 321 classifies the sound data into different groups according to measurement timings. In the present embodiment, the sound data is classified into two types, namely the above first and second measurements. Next, in step S103, the classifying unit 321 classifies the sound data into different groups according to print setting information such as a type of printing material. The operation speed of an actuator changes in accordance with a type of printing material such as plain paper or thick paper, and thus the sound data is classified into different groups according to a type of printing material. In step S104, the classifying unit 321 classifies the sound data into groups, in each of which all of the states of driving and stopping of the actuators in the 16 time intervals, namely in the data 1 to 16 are the same. In the present embodiment, classification is performed such that operation timings of all of the actuators that are notified by the state notification unit 160 match in each group, but there is no limitation thereto, and classification may be performed such that operation timings of some of the actuators are the same in each group. That is to say, for sound data belonging to the same group, operation timings of all of the actuators do not need to match. The sound data may be classified into groups with a focus on an operation timing of at least one actuator. Note that a classification method is not limited to the above-described method. A step of classifying the data according to whether an image forming operation is monochromatic image formation (monochrome operation) or multi-color image formation (color operation) may be added to the above classification, for example.

The statistics calculation unit 322 calculates statistical values P respectively for the 16 time intervals, for the subsets of sound wave level data subjected to classification by the classifying unit 321. In step S105, the statistics calculation unit 322 calculates statistical values P for a predetermined number of most recent pieces of sound wave level data, for each subset (for each classification). In the present embodiment, the fifth most recent piece of data from among of the most recent 100 pieces of data (the fifth piece of sound wave level data from the top) is used as a statistical value P.

Figure 5:
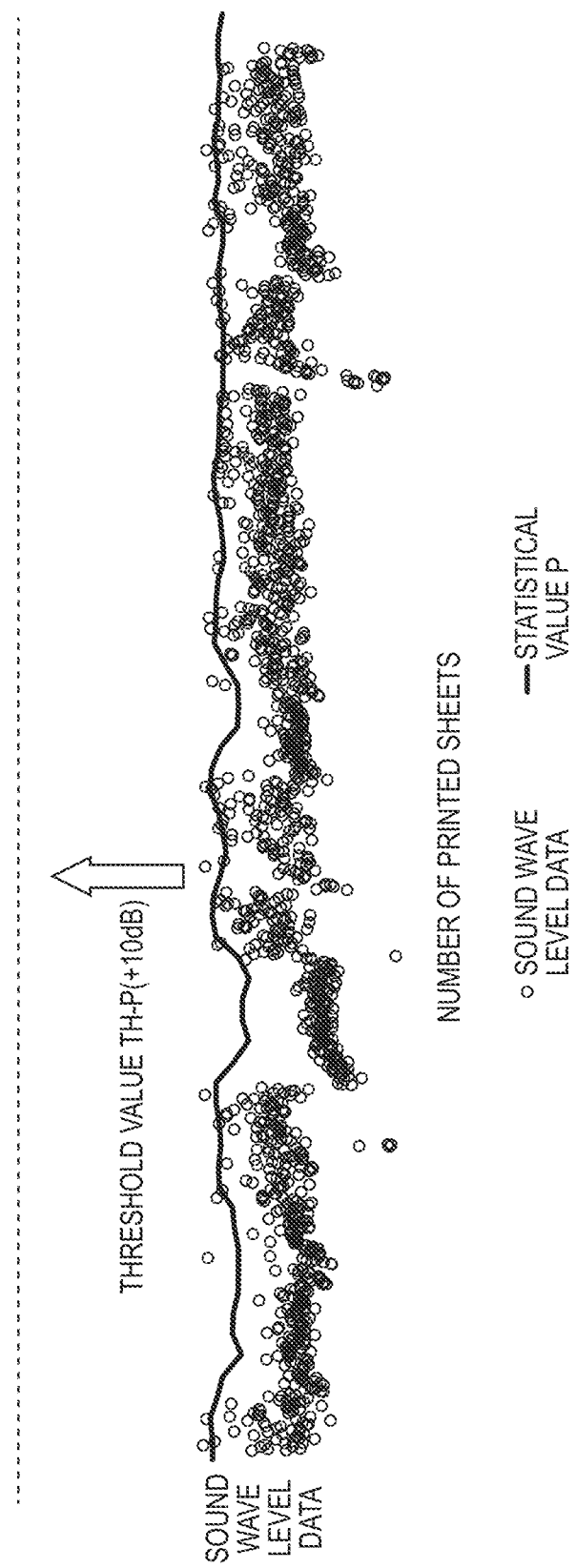
FIG. 5 is a graph showing, in time series, examples of sound wave level data, a statistical value, and a threshold value according to the first embodiment.

In step S106, the threshold setting unit 323 determines whether or not 100 or more statistical values P have been calculated. That is to say, 100×100=10000 pieces of sound wave level data have been obtained at this stage. If it is determined that there are 100 or more statistical values P (YES in step S106), the procedure advances to step S107, and the threshold setting unit 323 determines whether or not a threshold value TH-P has been set. If it is determined that the threshold value TH-P has not been set (NO in step S107), the procedure advances to step S108. In step S108, the threshold setting unit 323 performs statistics processing on 100 statistical values P, and sets the threshold value TH-P. The threshold setting unit 323 calculates the average value of 100 statistical values P, for example. FIG. 5 is a graph in which the horizontal axis indicates the number of print sets, and the vertical axis indicates sound wave level data. A value that differs, by 10 dB, away from the average value of statistical values P indicated by a solid line is set as the threshold value TH-P. If it is determined in step S107 that the threshold value TH-P has been set (YES in step S107), or if it is determined in step S106 that the number of statistical values P is smaller than 100 (NO in step S106), the threshold setting unit 323 ends the processing without setting a threshold value. Note that a method for calculating statistical values P is not limited to the above method. A statistical value P can be the median value or the largest value of any most recent pieces of sound wave level data, for example. Similarly, a method for setting the threshold value TH-P is not limited to the above method. The threshold value TH-P can be obtained by increasing the median value or the largest value of any number of statistical values P using a predetermined method, for example.

FIG. 6 is a diagram showing an example in which sound wave level data and actuator information are obtained. FIG. 6 shows a case where sound wave level data and information indicating whether or not the actuators have been driven are obtained in a plurality of time intervals (in this example, 16 time intervals of the data 1 to 16). In addition, FIG. 6 shows an example of results of the classifying unit 321 classifying sound data obtained in the second measurement, using the operation states of the actuators in step S104. The item group 610 ranging from the feed motor to the fixing motor corresponds to actuator information, and indicates that the motors were being driven or not during the time intervals. In the actuator information, "1" indicates a state where the actuator is being driven, and "0" indicates a state where the actuator is stopped. As shown in FIG. 6, in the present embodiment, data obtained in the second measurement is classified into two groups, namely a group A (table 6a) and a group B (table 6b) based on the actuator information. In the group A and the group B, stop timings of the YMC photosensitive member drum motor indicated by hatching in the tables differ. By performing classification according to the operation states of the actuators in this manner, it is possible to form subsets in which variation in sound wave level data is small, and sound wave levels are stable.

Figure 7:
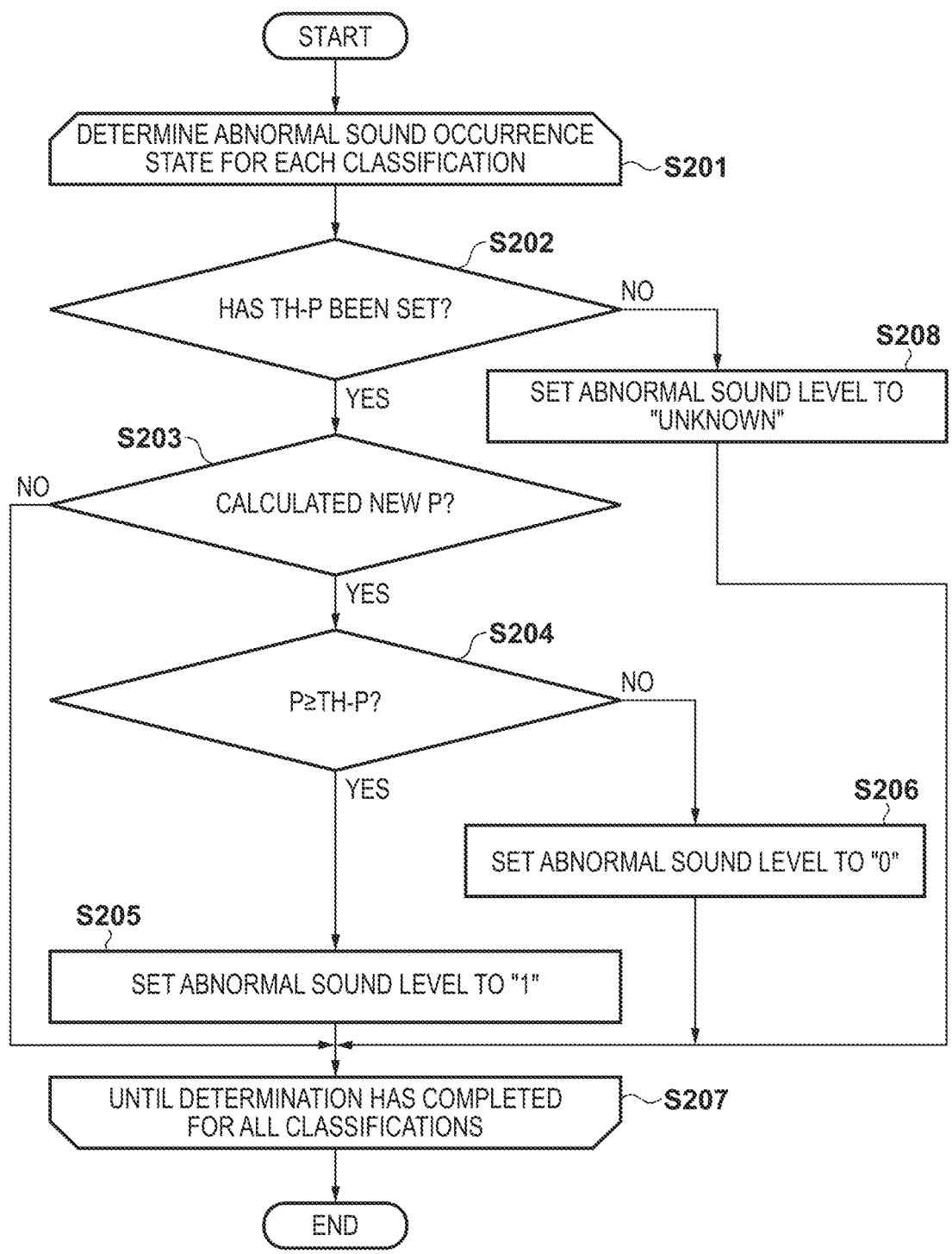
FIG. 7 is a flowchart showing an example of processing that is performed by an abnormal sound determination unit according to the first embodiment.

FIG. 7 is a flowchart showing an example of processing that is performed by the abnormal sound determination unit 324 in the present embodiment. The processing of steps S201 to S207 is abnormal sound determination processing that is performed in the 16 time intervals for each of the classifications performed in steps S102 to S104. In step S202, the abnormal sound determination unit 324 determines whether or not the threshold value TH-P has been set in step S108. If the threshold value TH-P has not been set yet (NO in step S202), the procedure advances to step S208, and the abnormal sound determinssssation unit 324 determines that the abnormal sound level for the classification is "unknown". If the threshold value TH-P has been set (YES in step S202), the procedure advances to step S203. In step S203, the abnormal sound determination unit 324 determines whether or not a new statistical value P has been calculated in step S105. If it is determined that a new statistical value P has not been calculated for classification targeted for processing (NO in step S203), the abnormal sound determination unit 324 advances the procedure to the next classification. If it is determined that a new statistical value P has been calculated (YES in step S203), the procedure advances to step S204. In step S204, the abnormal sound determination unit 324 determines whether or not the new statistical value P is larger than or equal to the threshold value TH-P. If it is determined that the new statistical value P is larger than or equal to the threshold value (YES in step S204), the procedure advances to step S205, and the abnormal sound determination unit 324 determines that abnormal sound has occurred, and sets the abnormal sound level of the classification to "1". If it is determined that the new statistical value P is smaller than the threshold value (NO in step S204), the abnormal sound determination unit 324 makes a determination of "normal", and sets the abnormal sound level of the classification to "0" in step S206. The above-described processing is repeated until the above determination is complete for all of the classifications (step S207).

Figure 8:
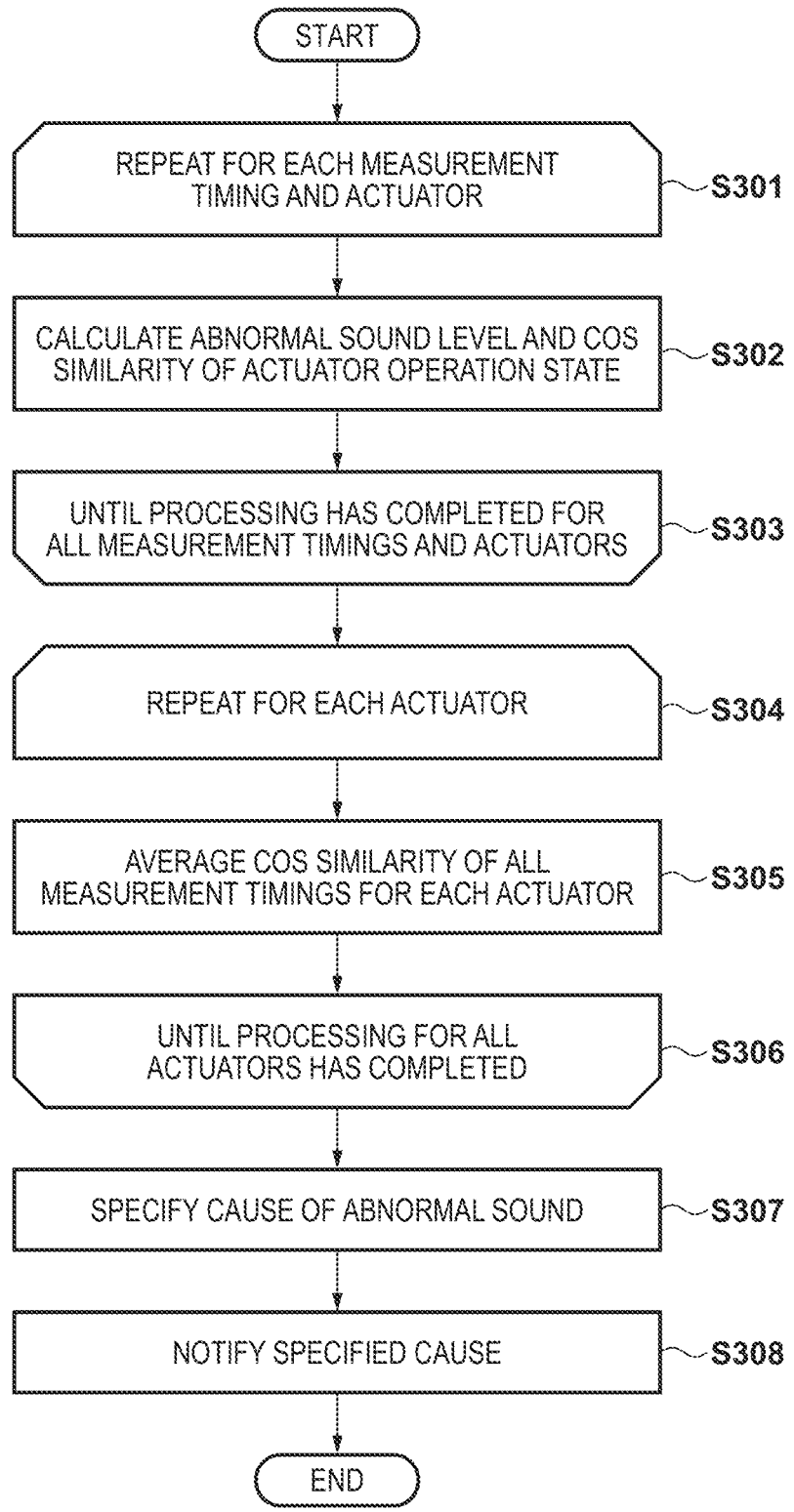
FIG. 8 is a flowchart showing an example of processing that is performed by a cause specifying unit according to the first embodiment.

The cause specifying unit 325 compares occurring states of abnormal sound and driving states of the actuators at measurement timings, obtains a plurality of comparison results, and specifies a cause of abnormal sound based on the plurality of comparison results. A specific example of processing for specifying a cause of abnormal sound based on comparison of occurring states and driving states will be described below. FIG. 8 is a flowchart showing an example of processing that is performed by the cause specifying unit 325, in the present embodiment. The processing of steps S301 to S303 is executed for sound data for which abnormal sound levels have been determined by the abnormal sound determination unit 324 (steps S205 and S206) for each measurement timing and for each actuator. In step S302, the cause specifying unit 325 compares occurring states of abnormal sound and driving states of the actuators, and determines a similarity based on the comparison results. An example of a specific method for determining a similarity will be described. The cause specifying unit 325 regards, as a 16-dimensional vector, each of a series of indications of abnormal sound occurring or not in the data 1 to 16 (occurring states) and a series of indications of a specific actuator being driven or not (driving states), and calculates a cosine (hereinafter, COS) similarity thereof. A COS similarity when the abnormal sound levels are represented by a vector A and the operation states of each actuator are represented by a vector B is expressed by Expression 1 below.

$$\text{COS similarity} = \frac{\vec{A} \cdot \vec{B}}{|\vec{A}||\vec{B}|} \quad (1)$$

In the present embodiment, the closer the COS similarity is to 1, that is to say, the larger the COS similarity is, the higher it is determined that the likelihood of the actuator emitting abnormal sound is. Note that, when abnormal sound is not occurring and the abnormal sound levels of the data 1 to 16 are 0, the vector A of the abnormal sound levels is also 0, and thus the above COS similarity cannot be calculated. Therefore, in the present embodiment, when the vector A of abnormal sound levels is 0, the COS similarity is set to 0. Note that, in the present embodiment, a COS similarity is used for a method for determining a similarity, but there is no limitation thereto, and another method may be used.

Description will be given below using one classification for each of the first measurement and the second measurement from among a plurality of classifications. FIGS. 9A and 9B show results of calculating COS similarities of the actuators at first and second measurement timings, as well as abnormal sound levels and driving states of the actuators in the 16 time intervals of the data 1 to 16. In the first measurement, the abnormal sound levels in the data 1 to 16 are all "1". On the other hand, the operation states of the YMC photosensitive member drum motor in the data 1 to 13 are "0" indicating a stopped state, and the operation states of the YMC photosensitive member drum motor in the data 14 to 16 are "1" indicating a driving state. A COS similarity calculated by using two pieces of data as vectors as described above is 0.43. The cause specifying unit 325 repeats the above processing until it is executed completely on all of the actuators at all of the measurement timings.

Returning to FIG. 8, in steps S304 to S306, the cause specifying unit 325 calculates the average of COS similarities calculated in steps S301 to S303, for each actuator. Steps S304 and S306 indicate that processing is repeated so as to process all of the actuators. In the examples in FIGS. 9A and 9B, the cause specifying unit 325 specifies a cause based on the results of calculating COS similarities at two measurement timings. In step S305, the cause specifying unit 325 calculates the average value of COS similarities calculated for all of the measurement timings, for each actuator. The cause specifying unit 325 repeats such averaging of COS similarities until it is executed completely for all of the actuators (step S306). FIG. 9C shows results of the cause specifying unit 325 averaging COS similarities for all of the actuators. In step S307, the cause specifying unit 325 specifies an actuator corresponding to occurrence of abnormal sound from among the plurality of actuators based on the averaged COS similarities. In the present embodiment, since the COS similarity of the fixing motor 95 is 1.00, the cause specifying unit 325 determines that the fixing motor 95 is an actuator that is a cause of abnormal sound. In addition, the cause specifying unit 325 specifies, as a cause of abnormal sound, an operating unit at least a portion of which is driven by the actuator determined as the cause of abnormal sound, from among a plurality of operating units. In this example, it is the fixing unit 30 that is driven by the fixing motor 95, and thus the cause specifying unit 325 specifies the fixing unit 30 as a unit that is a cause of abnormal sound. In step S308, the notification unit 330 notifies the engine control unit 110, the host computer 200 of the user, the dealer, or the like, a printer management tool (not shown), and the like, of a result of specifying a cause, by communicating therewith. Note that the notification unit 330 may perform notification using a display device of the server 300. A configuration may also be adopted in which the notification unit 330 notifies the printer 100 of the result of specifying the cause, and the result is displayed on a display unit of the printer 100.

Note that it is envisioned that there are cases where the amount of data is too small to determine an abnormal sound level, depending on a measurement timing. In such a case, "−1" indicating "unknown" is set as a COS similarity, so as to lower the averaged COS similarity. Accordingly, a cause can be prevented from being specified when data has not been obtained for all of the measurement timings.

As described above, according to the first embodiment, regardless of whether abnormal sound is unknown or known, it is possible to specify an actuator or a unit that is emitting abnormal sound. Note that, in the above description, a cause of abnormal sound is specified based on occurring states of abnormal sound and driving states of actuators at two measurement timings (based on the average value of COS similarities), but there is no limitation thereto. A cause of abnormal sound may also be specified based on an occurring state of abnormal sound and driving states of actuators at one measurement timing, for example. Note that it is possible to improve the accuracy for specifying a cause of abnormal sound by using a plurality of measurement timings. With only the first measurement, a cause of abnormal sound can only be narrowed down to two actuators for which the COS similarities are high, that is to say, the feed motor and the fixing motor, but, in the present embodiment, it is possible to specify one actuator, namely the fixing motor, for example.

In addition, when abnormal sound occurs, the user or dealer can address it in a short time by being notified of the cause of abnormal sound. Particularly, the dealer can address a malfunction of the printer 100 by visiting the user once, making it possible to prevent unnecessary visit.

Note that actuators can include not only a motor but also a sensor, a solenoid, an electromagnetic clutch, and the like, and it is also possible to specify a cause in a more specific manner based on the operation states and abnormal sound levels thereof. In addition, in the above description, the cause specifying unit 325 specifies an actuator whose COS similarity is 1.00, as an actuator corresponding to occurrence of abnormal sound, but there is no limitation thereto. An actuator for which a COS similarity that is higher than a predetermined threshold value is obtained may be specified as an actuator corresponding to occurrence of abnormal sound. In addition, in the present embodiment, only one threshold value TH-P is set, but there is no limitation thereto. Two threshold values TH-P may be provided, and three abnormal sound levels, namely "0", "1", and "2" may be provided, for example. In this case, when a COS similarity is calculated, the vector A of abnormal sound levels is generated with the abnormal sound levels "1" and "2" replaced with "1". This is because, if the components of the vector A includes both "1" and "2", a resulting COS similarity is lower than a COS similarity resulting from the vector A constituted only by components of "1". A change in a COS similarity when abnormal sound is occurring at the same timing is not preferable. For this reason, when a COS similarity is calculated, the vector components "1" and "2" are all replaced with "1" as described above. Then, if sound data includes an abnormal sound level of "2" after the source of occurrence of abnormal sound is specified by the cause specifying unit 325, the notification unit 330 notifies the dealer that major abnormal sound is occurring, and urges the dealer to promptly address the abnormal sound. On the other hand, a configuration may be adopted in which, if sound data includes only an abnormal sound level of "1", the notification unit 330 notifies the dealer that minor abnormal sound is occurring, and urges the dealer to prepare for addressing the abnormal sound. In addition, a configuration may be adopted in which the vector A of abnormal sound levels is generated without changing abnormal sound levels of "1" and "2", and a COS similarity is calculated, and a cause is specified.

Second Embodiment

In the first embodiment, sound is measured during a normal print operation (image forming operation), and a cause of abnormal sound is specified. In a second embodiment, in order to enable appropriate image forming, sound during an operation of correcting the concentration of toner, which is called calibration, is measured, and a cause of abnormal sound is specified based on the result. The second embodiment will be described below with a focus on differences from the first embodiment.

Calibration includes two types of operations, namely a single-color operation (hereinafter, a "monochrome operation") for performing single-color condition correction and a multi-color operation (hereinafter, a "full-color operation") for performing multi-color condition correction, and is executed in accordance with a print status of the user. For the user who often performs full-color printing, the rate of calibration in a full-color operation is higher, for example. In addition, different actuators are driven in the monochrome operation and the full-color operation. In a case of the monochrome operation, the intermediate transfer member/K photosensitive member drum motor 92 is driven, and, in a case of the full-color operation, the YMC photosensitive member drum motor 93 is driven in addition to the motor used in the monochrome operation.

In measurement of sound during a calibration operation, sound is measured at a timing when an actuator that is driven in the monochrome or full-color operation state is constantly driven. Thus, when abnormal sound is occurring, all of the motors that are being driven are estimated as a cause of the abnormal sound.

FIG. 10 shows a table indicating results obtained by measuring sound during calibration, and the cause specifying unit 325 calculating COS similarities described in the first embodiment. As indicated in the table, in the full-color operation, COS similarities of the intermediate transfer member/K photosensitive member drum motor 92 and the YMC photosensitive member drum motor 93 are higher. That is to say, it is possible to determine that there is the possibility that abnormal sound is occurring in one of the drive units in which intermediate transfer member units, Y, M, C, and K process cartridges or the motors thereof are disposed. On the other hand, the COS similarity of the intermediate transfer member/K photosensitive member drum motor 92 in the monochrome operation is 0.0, indicating a state where abnormal sound is not occurring. A cause of abnormal sound is specified based on COS similarity calculation results such as those described above.

Figure 11:
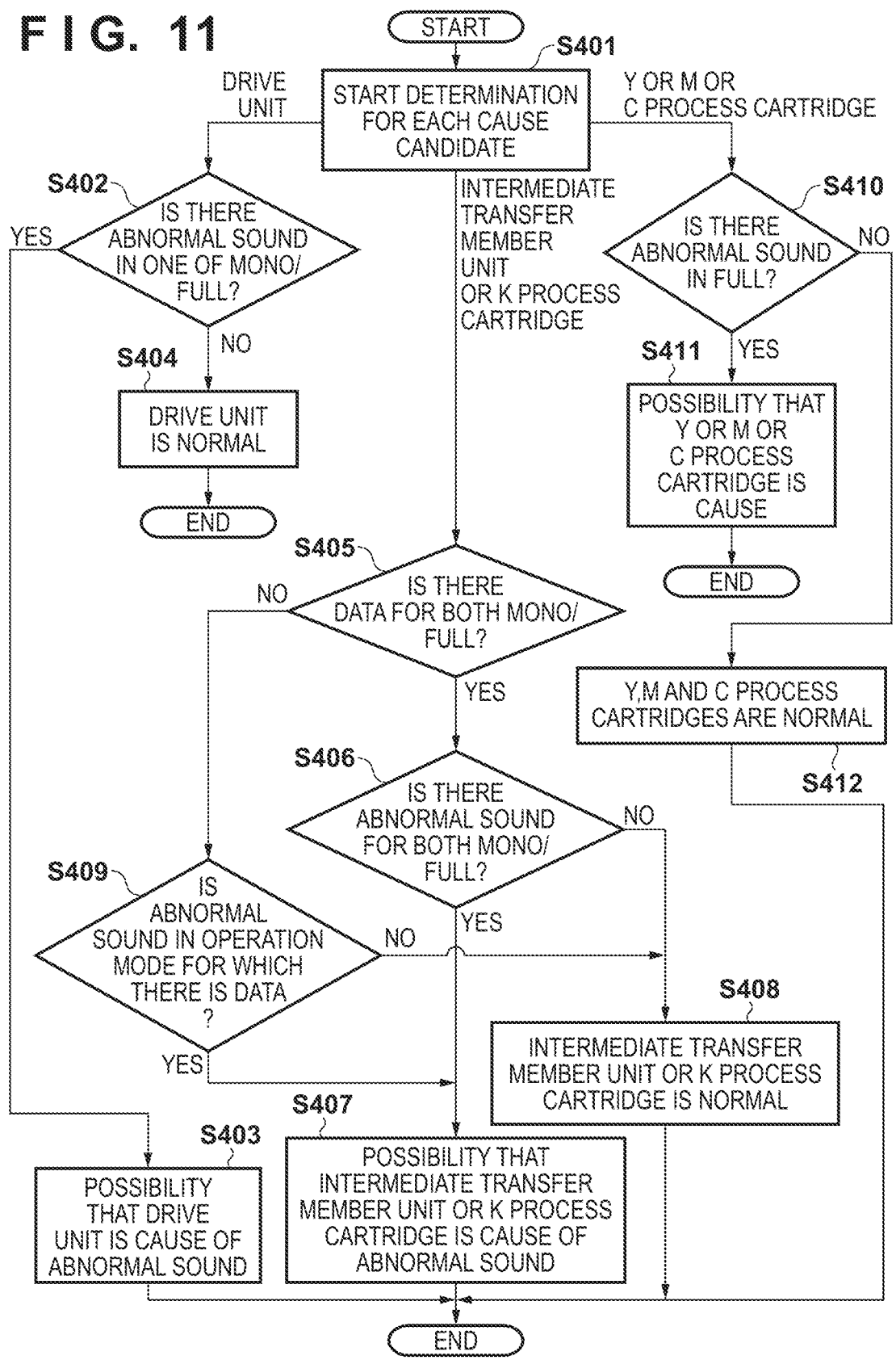
FIG. 11 is a flowchart showing an example of processing that is performed by the cause specifying unit according to the second embodiment.

FIG. 11 is a flowchart showing processing for specifying a cause of abnormal sound during calibration, the processing being performed by the cause specifying unit 325. In step S401, the cause specifying unit 325 starts processing of a plurality of candidates that can be a cause of abnormal sound, in order to determine whether or not each of the candidates is a cause of abnormal sound. The plurality of candidates include, for example, the intermediate transfer member unit or the K process cartridge, the Y, M, and C process cartridges, and a drive unit (the intermediate transfer member/K photosensitive member drum motor 92 or the YMC photosensitive member drum motor 93).

First, processing for specifying whether or not the drive unit is a cause of abnormal sound will be described. In step S402, in order to specify whether or not a drive unit is a cause of abnormal sound, the cause specifying unit 325 determines whether or not abnormal sound is occurring in the monochrome operation ("mono" in the flowchart) or the full-color operation ("full" in the flowchart). This is because, even when abnormal sound is occurring either in the monochrome operation or in the full-color operation, there is the possibility that abnormal sound is occurring in both of the drive units that are driving them. If it is determined in step S402 that abnormal sound is occurring (YES in step S402), the procedure advances to step S403, and the cause specifying unit 325 determines that there is the possibility that a drive unit is a cause of the abnormal sound. If it is determined that abnormal sound is not occurring (NO in step S402), the cause specifying unit 325 determines in step S404 that the drive units are normal. In the case of the results of COS similarities in FIG. 10, abnormal sound is occurring in the full-color operation, and thus the cause specifying unit 325 determines that there is the possibility that a drive unit is the cause of abnormal sound.

Next, processing for specifying whether or not the intermediate transfer member unit or the K process cartridge is a cause of abnormal sound will be described. When the intermediate transfer member unit or the K process cartridge is a cause of abnormal sound, abnormal sound is necessarily occurring both in the monochrome operation and the full-color operation. First, in step S405, the cause specifying unit 325 determines whether or not there is data (calculated COS similarities) for both the monochrome operation and the full-color operation. If it is determined that there is data (COS similarities) for both operations (YES in step S405), the cause specifying unit 325 determines in step S406 whether or not abnormal sound is occurring in both the monochrome operation and the full-color operation. If it is determined that abnormal sound is occurring in both the monochrome operation and the full-color operation (YES in step S406), the procedure advances to step S407, and the cause specifying unit 325 determines that there is the possibility that the intermediate transfer member unit or the K process cartridge is a cause of abnormal sound. If it is determined that abnormal sound is not occurring in at least one of the monochrome operation and the full-color operation (NO in step S406), in other words, abnormal sound occurred only in one of the monochrome operation and the full-color operation, or no abnormal sound occurred in both the monochrome operation and the full-color operation, the procedure advances to step S408. In step S408, the cause specifying unit 325 determines that the intermediate transfer member unit or the K process cartridge is normal. In the case of the COS similarities in FIG. 10, for example, abnormal sound is not occurring in the monochrome operation, and thus it is determined that the intermediate transfer member unit or the K process cartridge is normal.

Next, processing for specifying whether or not the intermediate transfer member unit or the K process cartridge is a cause of abnormal sound will be described. If it is determined in step S405 that there is no data for both the monochrome operation and the full-color operation (NO in step S405), the procedure advances to step S409. In step S409, the cause specifying unit 325 determines whether or not abnormal sound is occurring in an operation mode for which data is present. If it is determined that abnormal sound is occurring (YES in step S409), the procedure advances to step S407, and the cause specifying unit 325 determines that there is the possibility that the intermediate transfer member unit or the K process cartridge is a cause of abnormal sound. If it is determined that abnormal sound is not occurring (NO in step S409), the procedure advances to step S408, and the cause specifying unit 325 determines that the intermediate transfer member unit and the K process cartridge are normal.

Next, processing for specifying whether or not the Y, M, or C process cartridges is a cause of abnormal sound will be described. If the Y, M, or C process cartridge is a cause of abnormal sound, abnormal sound is necessarily occurring only in the full-color operation. For this reason, in step S410, the cause specifying unit 325 determines whether or not abnormal sound is occurring in the full-color operation. If it is determined that abnormal sound is occurring in the full-color operation (YES in step S410), the cause specifying unit 325 determines in step S411 that there is the possibility that at least one of the Y, M, and C process cartridges is a cause of abnormal sound. If it is determined that abnormal sound is not occurring in the full-color operation (NO in step S410), the cause specifying unit 325 determines in step S412 that the Y, M, and C process cartridges are normal.

When COS similarities such as those shown in FIG. 10 are obtained as a result of the cause specifying unit 325 specifying a cause by performing the above-described processing, a cause of abnormal sound can be narrowed down to the Y, M, and C process cartridges or a drive unit.

As described above, according to the second embodiment, a cause of abnormal sound can be more effectively narrowed down than in a case of specifying a cause of abnormal sound independently for each of the monochrome operation or the full-color operation. Note that, in the present embodiment, description has been given using calibration as an example, but there is no limitation thereto, and, for example, sound immediately after a power supply is turned on, or operation sound of a cleaning sequence for cleaning the photosensitive member drum or the intermediate transfer member, or the like may be measured, and applied for specifying a cause.

Third Embodiment

An image forming apparatus according to a third embodiment includes two types of cleaning blades, namely the drum cleaning blades 4 and the intermediate transfer member cleaning blade 16. In each of these cleaning blades, a blade abuts on a drum or an intermediate transfer member so as to scrape toner, and thus frictional force occurs in the abutting portion. A leading end of the cleaning blade may vibrate due to this frictional force, and abnormal sound may occur. Particularly, when the temperature is low (10° C. or lower), rubber of each cleaning blade hardens, and thus abnormal sound is likely to occur. On the other hand, during continuous printing in which the image forming apparatus is constantly operating, the temperature of the cleaning blade rises due to the frictional force, and abnormal sound is less likely to occur. In the third embodiment, the accuracy for specifying a cause of abnormal sound is improved by applying this principle. The third embodiment will be described below with a focus on differences from the first and second embodiments.

A schematic configuration of the printer 100 according to the third embodiment is the same as that shown in FIG. 1. The temperature detection unit 72 for detecting a temperature is provided in the printer 100 according to the present embodiment. Note that, in the present embodiment, a threshold value is set to 10° C., and if a temperature detected by the temperature detection unit 72 is lower than or equal to the threshold value, it is determined that the temperature state is a low-temperature state, and if the detected temperature is higher than the threshold value, it is determined that the temperature state is a high-temperature state, but as a matter of course, there is no limitation thereto.

FIG. 12 is a table indicating results of the cause specifying unit 325 calculating COS similarities by measuring sound during calibration in the low-temperature state and the high-temperature state determined as the temperature state based on a result of the temperature detection unit 72 detecting a temperature. In the present embodiment, as indicated by the table, COS similarities are higher in the full-color operation only in the low-temperature state.

Figure 13:
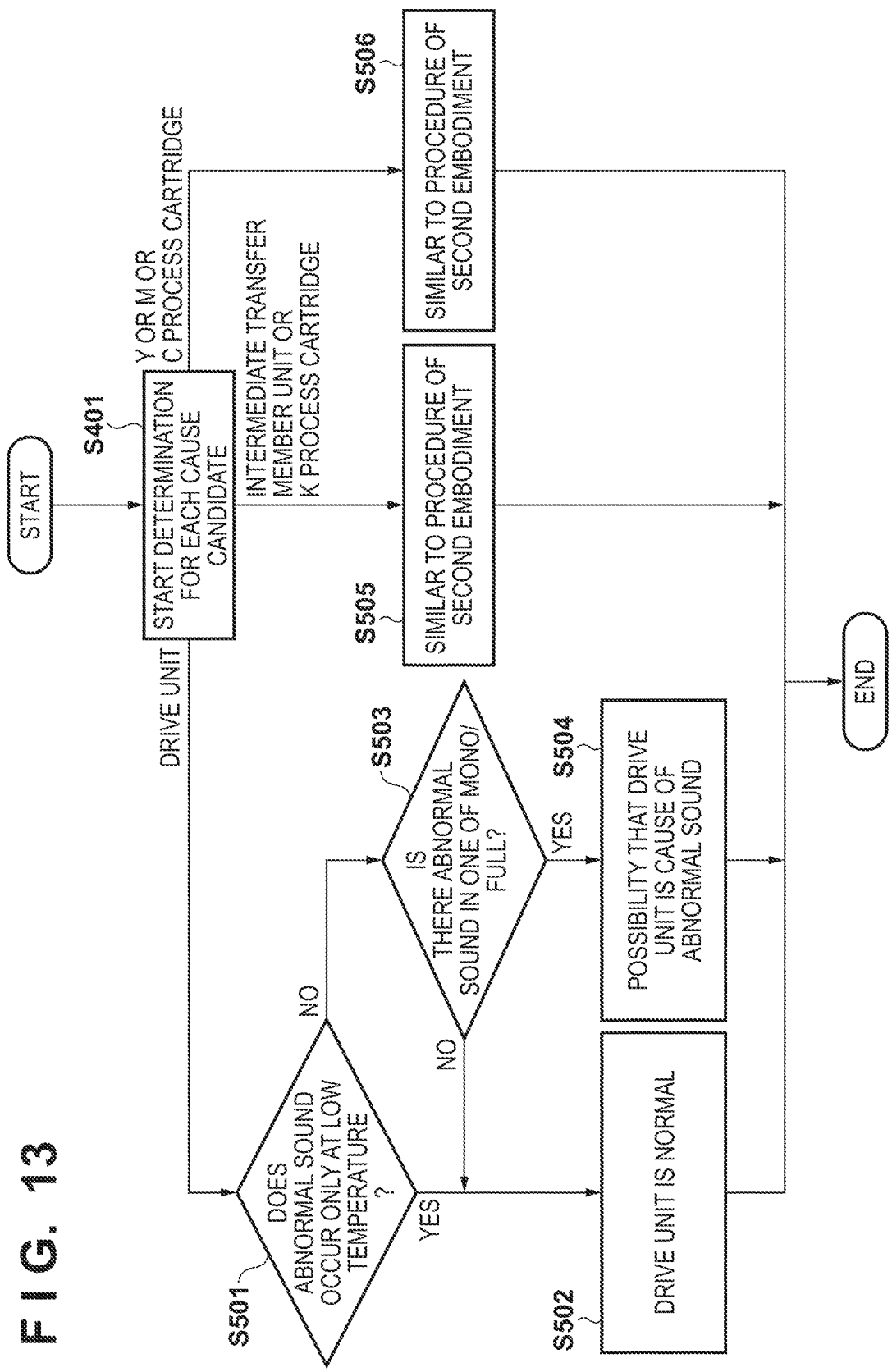
FIG. 13 is a flowchart showing an example of processing that is performed by the cause specifying unit according to the third embodiment.

FIG. 13 is a flowchart showing processing for specifying a cause according to the third embodiment. Note that, in FIG. 13, a portion of the flowchart is similar to that in the second embodiment (FIG. 11), and is thus omitted.

First, processing for specifying whether or not the drive unit is a cause of abnormal sound will be described. When abnormal sound is occurring only in the low-temperature state, it may be determined that a cleaning blade is emitting abnormal sound and abnormal sound is not occurring in a drive unit, in the above principle. For this reason, first, in step S501, the cause specifying unit 325 determines whether or not abnormal sound is occurring only in the low-temperature state. If abnormal sound is occurring only in the low-temperature state (YES in step S501), the procedure advances to step S502, and the cause specifying unit 325 determines that the drive unit is normal. On the other hand, if abnormal sound is occurring in a state other than the low-temperature state (NO in step S501), the procedure advances to step S503, and the cause specifying unit 325 determines whether or not abnormal sound is occurring in the monochrome operation or the full-color operation. If it is determined that abnormal sound is not occurring (NO in step S503), the procedure advances to step S502, and the cause specifying unit 325 determines that the drive unit is normal. If it is determined that abnormal sound is occurring (YES in step S503), the procedure advances to step S504, and the cause specifying unit 325 determines that there is the possibility that the drive unit is a cause of the abnormal sound. Determination processing for another unit is the same as that in the second embodiment. That is to say, step S505 corresponds to steps S405 to S409, and step S506 corresponds to steps S410 to S412. In the example shown in FIG. 12, COS similarities are higher (abnormal sound is occurring) only in the full-color operation in the low-temperature state, and thus the drive unit are normal (step S502), and at least one of the Y, M, and C process cartridges can be specified as a cause of the abnormal sound.

As described above, according to the third embodiment, by using occurrence statuses of abnormal sound in two types of states, namely the low temperature state and the high temperature state to specify a cause, it is possible to determine the likelihood of a drive unit being a cause of abnormal sound, and improve the cause specifying accuracy, for example. Note that, in the present embodiment, a cause is specified based on two types of operations, namely the monochrome operation and the full-color operation described in the second embodiment, and a state of an internal temperature, but there is no limitation thereto, and, for example, even when there is only data in the monochrome operation, it is possible to improve the cause specifying accuracy. In addition, in the present embodiment, the temperature detection unit 72 is disposed inside the apparatus, but there is no limitation thereto, and, for example, an estimation algorithm for estimating the internal temperature based on the number of continuous print sets and frequency may be applied without disposing the temperature detection unit 72.

Fourth Embodiment

In the first embodiment, sound is measured in accordance with an image forming operation, and a cause of abnormal sound is specified. In the fourth embodiment, a configuration will be described in which a cause of abnormal sound can be more accurately specified only in the second measurement that is performed in a state where noise is relatively small after the trailing edge of the last printing material has passed the receiving unit 71. The fourth embodiment will be described below with a focus on difference from the first embodiment.

When a cause is specified for the second measurement, for example, as shown in FIG. 14A, if the statuses of abnormal sound levels and timings of an operation of the feed motor 91 match, the feed motor 91 can be specified as a cause of abnormal sound based only on this data. However, sound waves and drive timings of motors are subjected to interval average calculation, and thus, as shown in FIG. 14B, there are cases where abnormal sound levels and states of the actuators (operation timings of the motors) do not completely match (data is recorded with changed measurement intervals). In such a case, a similarity (0.87) that is lower than a similarity in a state of a complete match is obtained even for the feed motor 91 whose COS similarity is highest, and thus there are cases where the feed motor 91 cannot be specified as a cause of abnormal sound. In order to solve such an issue, in the present embodiment, when an image forming operation is repeated, the accuracy for specifying a cause of abnormal sound is improved by changing the operation state of at least one of a plurality of actuator and obtaining similarities.

FIG. 14C is a specific example in which a stop timing of the feed motor 91 is changed. By changing the stop timing of the feed motor 91 in the data 3 to the data 6, the abnormal sound level also changes to "1" (abnormal sound occurring state) up to the data 7. In the present embodiment, the cause of abnormal sound is specified using two COS similarities for which the stop timing of the feed motor 91 varies.

Figure 15:
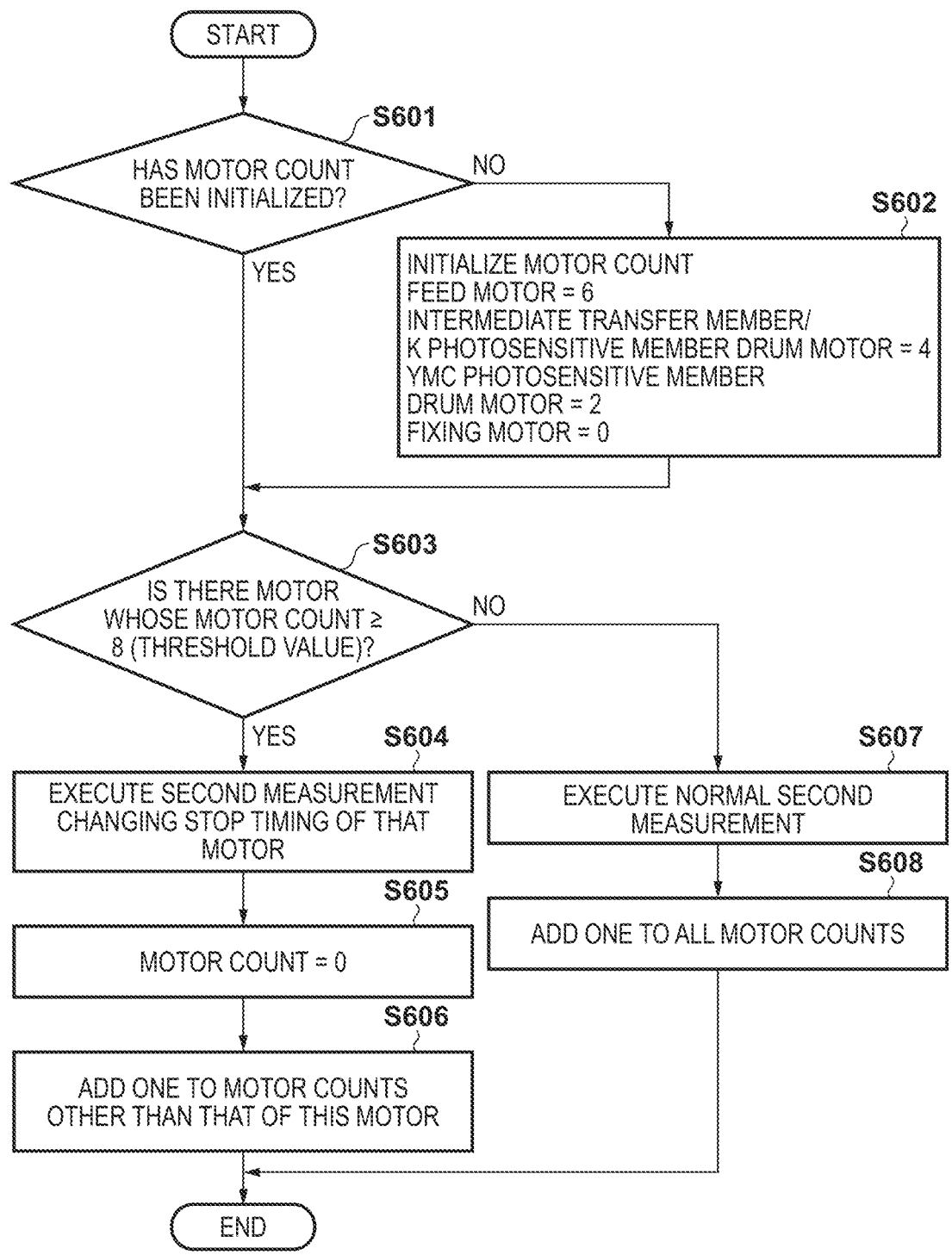
FIG. 15 is a flowchart showing an example of processing that is performed by the cause specifying unit according to the fourth embodiment.

FIG. 15 is a flowchart showing a procedure of sound measurement processing according to the fourth embodiment. When printing is started, first, in step S601, the driving control unit 170 determines whether or not initial values of counts for the four types of motors that are driven during the second measurement have been set. If it is determined that initial values have not been set (NO in step S601), the procedure advances to step S602, and the driving control unit 170 sets initial values of the counts for the motors. Initial values each of which is different from another by two are set, and, for example, the initial value of the count for the feed motor 91 is set to 6, and the initial value of the count for the intermediate transfer member/K photosensitive member drum motor 92 is set to 4.

In step S603, the driving control unit 170 determines whether or not there is a motor for which the count value is larger than or equal to a predetermined threshold value (in the present embodiment, 8) from among the four types of motors. If there is a motor for which the count value is larger than or equal to the predetermined threshold value (YES in step S603), the procedure advances to step S604, and the driving control unit 170 changes the stop timing of the motor. Due to this control, the stop timing of the motor for which the count value is larger than or equal to the predetermined threshold value is changed, and the second measurement is executed. Thereafter, in step S605, the driving control unit 170 sets the count value of the motor to 0. In step S606, the driving control unit 170 adds 1 to the count values of the other motors. On the other hand, if there is no motor for which the count value is larger than or equal to the threshold value (NO in step S603), the procedure advances to step S607, and the driving control unit 170 operates the motors at normal timings. Then, in step S608, the driving control unit 170 adds 1 to the count values for all of the four types of motors. By performing the second measurement through the above driving control, it is possible to alternatively execute normal measurement and measurement in a state where the stop timing of one motor for which the count value exceeds the threshold value is changed.

The cause specifying unit 325 calculates COS similarities based on results of normal measurement of the motors and measurement in which a motor stop timing is changed, and, if a COS similarity is larger than or equal to a threshold value (in this example, 0.8), specifies the motor as a cause of abnormal sound. In the present embodiment, as shown in FIGS. 14B and 14C, COS similarities before and after the stop timing of the feed motor 91 is changed are larger than or equal to 0.8, and thus the feed motor 91 is specified as an actuator that is a cause of abnormal sound. In addition, in the second measurement, it is the pair of resist rollers 25 that are driven by the feed motor 91, and thus the cause specifying unit 325 specifies the pair of resist rollers 25 as a unit that is a cause of abnormal sound.

As described above, according to the fourth embodiment, it is possible to improve the cause specifying accuracy by specifying a cause based on occurrence statuses of abnormal sound in two states in which an operation timing of a motor differs. Note that, in the present embodiment, an example has been described where a stop timing of a motor is delayed, but there is no limitation thereto, and a stop timing of a motor may be made earlier. Alternatively, an operation start timing of a motor may be changed, or timings for both operation start and operation stop may be changed. In addition, a frequency at which the motor stop timing is changed is not limited thereto, and, for example, a configuration may be adopted in which the number of sheets is counted, and a stop timing of one motor is changed in preset order at a time point when the number of sheets reaches a predetermined number of sheets.

Other Embodiments

In the above embodiments, the sound diagnosis unit 320 provided in the server 300 executes processing, but there is no limitation thereto, and, for example, the engine control unit 110 of the printer 100 may execute at least some of the functions of the sound diagnosis unit 320. In addition, some of the functions of the received sound processing unit 140 of the engine control unit 110 of the printer 100 (for example, the reference value setting unit 143, the squaring calculation unit 144, and the interval average calculation unit 145) and the sound wave information processing unit 150 may be provided in the server 300. In this case, the printer 100 transmits information indicating sound (for example, a digital value) and received by the receiving unit 71, to a received sound processing unit provided in the server 300 via a network. In addition, the state notification unit 160 transmits actuator information indicating operation states, to the sound wave information processing unit 150 provided in the server 300 via a network. The received sound processing unit of the server 300 calculates sound wave level data based on the information received from the printer 100, and the sound wave information processing unit 150 generates sound data based on the actuator information received from the state notification unit 160. The sound diagnosis unit 320 specifies whether or not abnormal sound is occurring in the printer 100, or specifies a unit that is emitting abnormal sound, based on the generated sound data. As described above, the engine control unit 110 of the printer 100 may execute at least some of the functions of the sound diagnosis unit 320, or the server 300 may execute at least some of the functions of the received sound processing unit 140 and the like.

In addition, a configuration is adopted in which a result of specifying a cause is notified to the host computer 200 of the user, dealer, or the like, a printer management tool (not shown), or the like, by the notification unit 330, but there is no limitation thereto. A result of specifying a cause may be notified to a display unit of a printer such as an operation panel included in the operation display unit 102, for example.

In addition, a plurality of above embodiments may be combined to further improve the cause specifying accuracy. The first embodiment and the second embodiment may be combined such that cause specifying processing in a monochrome operation and a full-color operation is added to processing for specifying a cause of abnormal sound during a print operation, for example. Alternatively, the first embodiment and the third embodiment may be combined such that processing for specifying whether or not a drive unit is a cause of abnormal sound in a print operation in the high-temperature state and a print operation in the low-temperature state is added.

In addition, an image forming apparatus (the printer 100) that performs an image forming operation has been illustrated as a target for specifying a cause of occurrence of abnormal sound, that is to say, a target of abnormal sound diagnosis, but there is no limitation thereto. Any apparatus that includes a plurality of driving units and a plurality of operating units, and in which an operation of the same sequence is repeatedly executed can be a target of abnormal sound diagnosis described in the above embodiments.

As described above, according to the present disclosure, regardless of known abnormal sound or unknown abnormal sound, it is possible to specify occurrence of abnormal sound and a cause thereof.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-076221, filed May 2, 2022, which is hereby incorporated by reference herein in its entirety.

What is claimed is:

1. An abnormal sound diagnosis system for specifying a cause of abnormal sound in an image forming apparatus that includes a plurality of operating units and a plurality of motors that drive the plurality of operating units, the system comprising:

a microphone configured to receive sound in a plurality of time periods in which at least one of the plurality of motors operates;
a display configured to display information;
a determination unit configured to determine a cause of an abnormal sound based on first abnormal sound information and second abnormal sound information; and
a notification unit configured to perform notification such that the display displays information indicating the cause of the abnormal sound,
wherein:
the plurality of motors includes a first motor and a second motor,
the plurality of time periods includes a first time period in which the first motor and the second motor operate and a second time period in which the second motor operates and the first motor does not operate,
the first abnormal sound information indicates an occurrence of the abnormal sound in the first time period, and
the second abnormal sound information indicates an occurrence of the abnormal sound in the second time period.

2. The abnormal sound diagnosis system according to claim 1, further comprising a specifying unit configured to specify a motor corresponding to the abnormal sound that has occurred, by calculating a cosine similarity of (i) a presence or an absence of an occurrence of the abnormal sound in each of the plurality of time periods, based on sound wave levels of sound in the plurality of time periods in which the plurality of motors operate, and (ii) a presence or an absence of an operation of the plurality of motors in each of the plurality of time periods determined by the determination unit.

3. The abnormal sound diagnosis system according to claim 2, wherein the determination unit collects and performs statistics processing on sound wave levels of the abnormal sound in the plurality of time periods, and determines (i) presence or absence of an occurrence of the abnormal sound in each of the plurality of time periods.

4. The abnormal sound diagnosis system according to claim 3, wherein, in the statistics processing, a threshold value is set based on the collected sound wave levels, for each of the plurality of time periods, and, if a statistical value of a predetermined number of most recent sound wave levels is larger than or equal to the threshold value, the determination unit determines the presence of an occurrence of the abnormal sound.

5. The abnormal sound diagnosis system according to claim 3, wherein the determination unit classifies the sound wave levels based on information regarding a printing material set in relation to an image forming operation, and performs the statistics processing for each classification.

6. The abnormal sound diagnosis system according to claim 3, wherein the determination unit classifies measured sound wave levels into groups in each of which driving states of at least one motor from among the plurality of motors in the plurality of time periods match, and performs the statistics processing for each classification.

7. The abnormal sound diagnosis system according to claim 2, wherein the specifying unit specifies an operating unit, at least a portion of which is driven by the specified motor, among the plurality of operating units, as an operating unit corresponding to the abnormal sound.

8. The abnormal sound diagnosis system according to claim 2, wherein:
the notification unit is further configured to perform notification of the motor specified by the specifying unit, or an operating unit, at least a portion of which is driven by the specified motor.

9. The abnormal sound diagnosis system according to claim 1, wherein the plurality of motors are configured to perform a predetermined operation, and the predetermined operation includes an operation related to image formation.

10. The abnormal sound diagnosis system according to claim 1, wherein
the determination unit is further configured to determine the cause of the abnormal sound based on the first abnormal sound information, the second abnormal sound information, first motor information, and second motor information,
the first motor information indicates that the two or more motors including the first motor in the plurality of motors operate in the first time period, and
the second motor information indicates that the two or more motors in the plurality of motors operate and the first motor does not operate in the second time period.

11. The abnormal sound diagnosis system according to claim 1, further comprising a specifying unit configured to specify a motor corresponding to the abnormal sound from among the plurality of motors.

12. An image forming apparatus that includes a plurality of operating units related to image forming, and a plurality of motors that drive the plurality of operating units, the image forming apparatus comprising:
a microphone configured to receive sound in a plurality of time periods in which at least one of the plurality of motors operates;
a display configured to display information;
a determination unit configured to determine a cause of an abnormal sound based on first abnormal sound information and second abnormal sound information; and
a notification unit configured to perform notification such that the display displays information indicating the cause of the abnormal sound,
wherein:
the plurality of motors includes a first motor and a second motor,
the plurality of time periods includes a first time period in which the first motor and the second motor operate, and a second time period in which the second motor operates and the first motor does not operate,
the first abnormal sound information indicates an occurrence of the abnormal sound in the first time period, and
the second abnormal sound information indicates an occurrence of the abnormal sound in the second time period.

13. An abnormal sound diagnosis method for specifying a cause of an abnormal sound that has occurred in an image forming apparatus that includes a plurality of operating units and a plurality of motors that drive the plurality of operating units, the method comprising:
receiving, by a microphone, sound in a plurality of time periods in which at least one of the plurality of motors operates;
displaying information on a display;
determining a cause of an abnormal sound based on first abnormal sound information and second abnormal sound information; and
performing notification such that the display displays information indicating the cause of the abnormal sound,
wherein:
the plurality of motors includes a first motor and a second motor,
the plurality of time periods includes a first time period in which the first motor and the second motor operate, and a second time period in which the second motor operates and the first motor does not operate,
the first abnormal sound information indicates an occurrence of the abnormal sound in the first time period, and
the second abnormal sound information indicates an occurrence of the abnormal sound in the second time period.

14. A non-transitory computer-readable storage medium that stores a program for causing a computer to execute an abnormal sound diagnosis method for specifying a cause of an abnormal sound that has occurred in an image forming apparatus that includes a plurality of operating units and a plurality of motors that drive the plurality of operating units, the method comprising:
receiving, by a microphone, sound in a plurality of time periods in which at least one of the plurality of motors operates;
displaying information on a display;
determining a cause of abnormal sound based on first abnormal sound information and second abnormal sound information; and
performing notification such that the display displays information indicating the cause of the abnormal sound,
wherein:
the plurality of motors includes a first motor and a second motor,
the plurality of time periods includes a first time period in which the first motor and the second motor operate, and a second time period in which the second motor operates and the first motor does not operate,
the first abnormal sound information indicates an occurrence of the abnormal sound in the first time period, and
the second abnormal sound information indicates an occurrence of the abnormal sound in the second time period.

* * * * *